Feb. 7, 1961 E. O. LAWRENCE 2,971,048

SELF-DECODING COLOR TELEVISION APPARATUS

Filed June 11, 1956 8 Sheets-Sheet 1

INVENTOR.
ERNEST O. LAWRENCE

BY Lippincott & Smith
ATTORNEYS

INVENTOR.
ERNEST O. LAWRENCE
BY Lippincott & Smith
ATTORNEYS

INVENTOR.
ERNEST O. LAWRENCE
BY
Lippincott & Smith
ATTORNEYS

INVENTOR.
ERNEST O. LAWRENCE
BY
Lippincott & Smith
ATTORNEYS

INVENTOR.
ERNEST O. LAWRENCE
BY
Lippincott & Smith
ATTORNEYS

Feb. 7, 1961 E. O. LAWRENCE 2,971,048

SELF-DECODING COLOR TELEVISION APPARATUS

Filed June 11, 1956 8 Sheets-Sheet 6

CYAN

INVENTOR.
ERNEST O. LAWRENCE

BY Lippincott & Smith

ATTORNEYS

INVENTOR.
ERNEST O. LAWRENCE
BY
Lippincott & Smith
ATTORNEYS

INVENTOR.
ERNEST O. LAWRENCE
BY
Lippincott & Smith.
ATTORNEYS

United States Patent Office 2,971,048

Patented Feb. 7, 1961

2,971,048

SELF-DECODING COLOR TELEVISION APPARATUS

Ernest O. Lawrence, Berkeley, Calif., assignor to Chromatic Television Laboratories, Inc., New York, N.Y., a corporation of California Filed June 11, 1956, Ser. No. 590,586

17 Claims. (Cl. 178—5.4)

This invention relates to apparatus for reproducing received NTSC (National Television Systems Committee) television signals in substantially natural color on a television image producing tube.

The invention will be described particularly in connection with a type of image-producing cathode-ray tube known in the art as the "Chromatron" tube. This tube, in its simplest form, is one having on or near one end a beam-receiving target forming a viewing surface or display screen upon which the image is created in color for viewing. The target or screen is composed of a multiplicity of extremely narrow strips of phosphors each of which is emissive on electron impact of light of one of the component colors chosen to reproduce the image. The selection of the color to be instantaneously displayed by the electron beam is accomplished in a region immediately adjacent to the target or viewing surface of micro-deflection of the impacting cathode-ray scanning beam which causes the beam controllably to be movable at impact from one to another character of strip. This control in the tube is achieved with a color-control grid structure supported in a plane generally parallel to the target and viewing surface. A color-control grid suitable for such use is formed from a multiplicity of elongated tautly stretched linear conductors generally coplanarly arranged with adjacent conductors electrically insulated from each other and alternate conductors electrically connected so as to form the group into two interleaved sets.

The phosphor coatings on the target are generally applied to the surface thereof adjacent to the color-control grid, with a thin film of electron permeable conducting metal to which a relatively high voltage with respect to either or both the source of the electron beam and the color-control grid is applied between the surface of the coated target area and the color-control grid in order that an intense electric field may be developed between these regions in tube operation. This strong field serves to focus the electron beam passing through the apertures of the color-control grid to a sharp point of impact at the phosphor-coated target surface.

A single cathode-ray beam, which is directed toward the target area to produce the image thereon, is developed within the tube by a suitable electron gun. This beam is signal modulated and directed through the apertures of the color-control grid to strike the target. The beam, prior to reaching the color-control grid, is also suitably initially deflected under the control of electromagnetic or electrostatic fields so as normally to trace a pattern corresponding to the desired raster over the target. Line scanning usually occurs in a direction substantially parallel to the linear conductors of the color-control grid. To achieve color selection and to provide for the impingement of the beam at any instant upon any particular chosen character of phosphor strip, suitable controllable deflection voltages are applied between adjacent linear conductors of the color-control grid whereby, depending upon the applied potential, the impacting electron beam at the target can be controllably shifted from one to another characteristic phosphor-coated strip of the target to establish a control of the instantaneously produced light.

The single electron beam developed is directed through the tube and the apertures of the color-control grid to strike the phosphor-coated target. The invention is directed primarily to circuitry and control instrumentalities whereby a received color television transmission signal of the aforesaid character, when suitably detected and supplied as a modulation upon the control grid of the cathode-ray tube thereby to control and modulate the intensity of the cathode-ray beam directed through the tube, functions to provide direct color-decoding within the tube, with resulting high brightness and resolution and without the utilization of electronic gates, whereby to key the impacting cathode-ray beam separately in accordance with each color of light instantaneously to be reproduced.

It has already been proposed in the art, wherein a color image-reproducing tube having but a single cathode-ray beam developed therein and deflected to scan the target area is utilized, to include circuitry whereby the impacting cathode-ray beam as it scans the target is oscillated or deflected relative to the apertures of the color-control grid at the frequency of the color sub-carrier developed in the transmission process. Systems of the prior art of suggested type, however, require circuitry for decoding the received NTSC signal thereby to derive signals indicative of the chosen three additive color components, such as the red, the green and the blue signals. Gating circuits for control function to key two of the three color signals at the frequency of the color sub-carrier during selected portions of each cycle of the color sub-carrier and also to key the third signal at twice the frequency of the color sub-carrier and for selected short time durations according to already known principles which have previously been discussed in the art. The gating period of the scanning cathode-ray beam in any position of the target is usually only that necessary to provide for beam passage and target impact for a period of approximately only 30° at either side of the voltage node of the gating frequency for the particular phosphor strips impacted by the scanning beam in the extremities of its deflection.

Circuitry to achieve the foregoing results, since the scanning beam moves most rapidly over the third, central or middle color of each color triplet, also must reduce the keying period for this central color, which is twice traversed during any beam oscillation cycle, to an even narrower angle and shorter time percentage of the cycle. The result is that the time period during which the scanning cathode-ray beam may impinge upon any particular phosphor strip to activate it to cause it to produce light in one or another observable color as a result of impact, is relatively small, with the consequent and inherent brightness reduction in the produced image. Further, the gating and keying circuits, while generally functioning satisfactorily despite the low light level realizable, add several tubes and other circuit component parts to the receiver and thus contribute substantially to the manufacturing cost of the color television receiver. Accordingly, circuitry which can apply the detected color television signals to control the image production without the need of complicated gating and decoding circuits serves, first, to increase the time period during which the scanning beam may impinge upon the target area to produce light, with resultant increase in light efficiency and, second, to reduce substantially the receiver cost while even increasing the overall receiver efficiency.

As is well known and is repeated herein only for the sake of completeness of reference, transmission of color television signals according to the principles advocated by NTSC, and now adopted in this country by the authorization of the Federal Communications Commission, provides that brightness or luminance information is transmitted upon the main video carrier. Chrominance or color information is transmitted upon a color sub-carrier (actually suppressed in transmission) separated from the main video carrier by any desired frequency separation, the reason for which and the precise separation need not herein be discussed in detail.

Actually, the present standards provide that the color sub-carrier frequency shall be 3.579545 mc. which, for the purpose of this explanation and disclosure, will herein be considered as 3.58 mc. Thus the signals transmitted from the color television transmitter are amplitude modulations of a video carrier and comprise those signals which are indicative of both the luminance and the chrominance present. The actual signal transmitted ($E_m$) may be considered as comprising a luminance signal ($E_y$) to which is added modulations indicative of the chrominance characteristics. Mathematically expressed, $$E_m = E_y + E_q \sin(\omega t + 33°) + E_i \cos(\omega t + 33°)$$

where $$E_q = 0.41(E_b - E_y) + 0.48(E_r - E_y)$$

and $$E_i = -0.27(E_b - E_y) + 0.74(E_r - E_y)$$

and $$E_y = 0.59E_g + 0.30E_r + 0.11E_b$$

and, with $E_y$ representing monochrome luminance, it will be noted that $E_g$, $E_b$ and $E_r$, respectively, represent the voltages for the green, blue and red color components of the signal.

As is also well known in the transmission of the color television signal, the so-called "I" and "Q" components are transmitted as two phase modulations of the color sub-carrier with the so-called "Q" signals modulating the sub-carrier in double sideband fashion out to about 0.5 mc. at either side of the sub-carrier, and the so-called "I" signals modulating the color sub-carrier on the low frequency side out to about 1.3 mc. and being suppressed at the upper sidebands beyond approximately 0.6 mc. from the color sub-carrier.

With the simultaneous modulation of the color sub-carrier by each of the "I" and "Q" signals being 90° out of phase, the transmission is effectively a rotating vector of which the reference angle $\sin(\omega t + 0°)$ is a signal transmitted in opposite phase to the standard color burst signal which follows each line sync pulse and occurs during the video blanking period. Accordingly, in the transmission, and according to the well known color circle diagram, the $-(B-Y)$ signal, to all intents and purposes, can be considered as in phase, and thus at an angle 0°, with the color burst signal; the $(R-Y)$ signal may be regarded as being 90° out of phase; the $(B-Y)$ signal can be viewed as approximately 180° out of phase with the burst, and, lastly, the $-(R-Y)$ signal as 270° out of phase with the burst signal. So considered, the signal indicative of saturated red occurs at approximately 103.4° and may be regarded as being out of phase by this angle with the $(B-Y)$ signal. The signal indicative of green then will occur at approximately 240.8° out of phase with the $(B-Y)$ signal, and the signal indicative of blue will appear at approximately 347.1° out of phase with the $(B-Y)$ signal. Similarly, and illustratively, the signal from which yellow, for instance, can be reproduced occurs between the signals to provide red and green, since yellow, per se, is additively a combination of equal amounts of red and green and an absence of blue.

By the described transmissions the color information signals are transmitted as amplitude modulations of a sub-carrier whose angle referred to an arbitrary reference may have any value from 0° to 360°. Practicing the invention herein contemplated will be explained in connections with a single-gun type of cathode-ray color television image-producing tube which provides the so-called "color-decoding" through a suitable control of the color-grid deflection control or switching effective on the scanning cathode-ray beam to establish the instantaneous placement or impact point of the beam on the different phosphor strips of the target area, which phosphor strips respond to the scanning cathode-ray beam passed through the apertures of the color-control grid to be instantaneously focused at some particular area of the phosphor-strip target. The cathode-ray beam directed through the apertures of the color-control grid is micro-deflected or switched under the control of locally developed and phased voltages so that, as it traverses each scanning line forming the raster over which the produced image is to be made discernible, it is oscillated or shifted according to a generally sine wave pattern to move back and forth across all three strips of any color triplet.

The scanning cathode-ray beam normally impinges upon one or the other of the outside two strips of each color triplet at each extremity or crest of its oscillation. Similarly, during the portion of the beam oscillation where the beam control voltage wave effective at the color-control grid is in the region of its nodal points the beam is more nearly electro-optically centered on the particular phosphor strip which is electro-optically centered with the grid aperture, this strip area being twice within the range of impact of the scanning beam during each full cycle of control.

In practicing the present invention, however, circuitry is provided which substantially avoids any electronic gating of the scanning cathode-ray beam as it is directed toward the target upon which the color image is developed for viewing. This lack of any requirement of complex gating circuitry substantially improves the duty cycle of the operation. Further than this, the phosphor-coated strip arrangement selected for reproducing the different colors of light on the impacted target is one which contributes least to the total quantity of light developed in the central position of the color triplet because of the shorter time period over which the scanning cathode-ray beam normally dwells in the area as it is oscillated in a generally sine wave path during its lateral deflection. Further than this, in the operation and control of the apparatus and circuitry herein to be explained and set forth, the scanning cathode-ray beam as it strikes the final target is caused to go through a complete color switching cycle in a time period corresponding to that required for the chrominance information included in the signal to go through all of its possible instantaneous values, which time coincides with that required for the color sub-carrier upon which the chrominance information is transmitted to oscillate through one cycle. To this end the invention provides for appropriately phasing the color-control grid potentials effective for switching so that the chrominance is at a reference 0, for instance, during the time that light of one particular color is produced by reason of the scanning beam impacting the phosphor-coated target strips. The chrominance will be at the reference 90° at the time a second of a plurality of color values is selected. At reference 180° the invention suppresses the scanning beam for a period corresponding to its second traversal of the first of the three traversed colors of the color triplet. Lastly, during the reference 270° a third color of light is developed due to the impact of the scanning cathode-ray beam upon the target, after which the cycle is repeated. Actually, at the 90°, the 270° and the 0° positions the produced light color usually will not be saturated value of one of the three primary or component colors of red, green or blue but the reference nonetheless may be considered illustrative. As will later become clear from what is to follow, the substantially saturated red will be developed at a reference approximately 103° so that the statement as to color is purely illustrative. Likewise, the suppression of the beam precedes the 180° position and continues to a time following the 180° phase.

According to the type of transmission of color information now approved in this country and sanctioned by the Federal Communciations Commission (the FCC) the transmitted color television signal can be transformed into any of an infinite number of sets of decoding axes, which fact immediately frees the invention herein set forth from restriction to any particular phase relationship of the signal and makes it free from limitation as to phosphor arrangement.

For convenience of reference, however, it will be assumed that in any color triplet for reproducing each point of the television image, and which color triplet includes phosphor strips to reproduce the point in each of the red, green and blue color components additively combining, when properly balanced, to make white, the phosphor strip to produce blue light is electro-optically centered on the aperture between any two adjacent linear conductors of the color-control grid. This arrangement establishes that a phosphor strip to produce the red and green components of the image is located at either side of the phosphor strip to produce blue light. Thus, in a sequence or color triplet of phosphor strips for reproducing the image there will be arranged on the target surface of the tube phosphor coatings in strip formation to produce light in the colors blue, green, blue, red, blue, green, blue, red, blue, etc., although again it is to be emphasized that the invention is in no way predicated upon any specific phosphor pattern, with the line scanning traces extending thus in the general direction of the blue strips and oscillating over the so-called red and green strips.

In practicing the invention described herein, the incoming color television signal constituting the composite encoded video signal is appropriately selected in well known manner, as in any television receiver, and passed through the normal number of video intermediate frequency amplifiers from which the signal passes through a video signal detector. After being detected, the resultant composite video signal is suplied to certain control circuitry herein to be set forth in some detail as constituting a significant part of this invention.

Prior to the detected composite video signal being supplied to modulate the cathode-ray beam developed within the image-producing tube it is passed into a peaking circuit and amplifier tube, the function of which is to boost or peak the chrominance information contained as a part of the composite signal relative to the low frequency information constituting the monochrome or luminance signal. The resultant signal, having its chrominance values peaked, is then applied to modulate a suitable beam control element of the image-reproducing cathode-ray tube, and, depending upon signal polarity, the modulating signal may be supplied as a modulation signal upon either a control electrode of the cathode-ray tube or upon the cathode thereof.

From the supplied and demodulated composite video signal the color sub-carrier frequency is separably redeveloped under the control of the color burst signal which follows each line sync pulse and occurs during a period of video signal blanking. The color sub-carrier is then suplied, with suitable amplification where desired, as a switching signal upon the tube color-control grid to micro-deflect the scanning cathode-ray beam passed through the tube to the phosphor-coated target in the region between the color-control grid and the phosphor-coated target instantaneously focused upon one or another of the phosphor strips thereby to reproduce the instantaneous signal modulated cathode-ray beam in one or another of the several component colors, dependent upon which phosphor strip is instantaneously impacted. Where desired, suitable delay circuits may be included in this last-named circuit in order to control the phasing of the developed sub-carrier with respect to the color burst signal.

In addition to the foregoing, this invention makes provision for the inclusion of a suitable circuit to control one of the modulating electrodes of the image-producing cathode-ray tubes, for instance, a control electrode or the cathode, and usually a modulating electrode other than that to which the video modulation has been supplied, in a way suitable to blank or suppress the scanning cathode-ray beam during that portion of its oscillation under the control of the generated sub-carrier when it would traverse one selected character of phosphor strips for the second time and in a position of approximately in phase with the color burst signal, which would be in a region of $-(B-Y)$, with the blanking effect being for a duration of a suitable angular relationship both preceding and following the $-(B-Y)$ region of the signal.

Broadly speaking, the invention, as constituted, provides a control of the color image reproduction through the application to the color-control grid of a color sub-carrier frequency voltage locally developed and appropriately phased to provide the color-deflection control voltage in the region of the target. Concurrently, the complete received video information including both the luminance and the chrominance portions of the composite video signals detected are supplied as a modulation upon the cathode-ray beam directed through the tube to the phosphor target. With this, there is a control or gating of the scanning cathode-ray beam during its alternative traverses of the phosphor strips to produce one of the three component colors, that is, as herein described, the blue light producing strips. Appropriate phasing of the incoming signal may be utilized to provide improved and corrected decoding beam current waveforms.

With the foregoing in mind, the present invention has, as one of its main objects, that of providing for reproducing standard color television signals as received by directly decoding these signals in a single-gun color television tube, while improving substantially the over-all brightness of the resultant image and therewith providing higher fidelity and resolution.

Other objects of the invention are those of providing improved television image reproduction in substantially natural color without the incorporation at the receiving instrumentality of circuit components functioning as gating devices used for directly deriving the individual component color signals.

A further object of the invention is that of providing in a self-decoding color image reproducing device a direct control over the relative amount of chrominance to luminance and at the same time to provide for reconstructing the television image to be observed in its natural colors in a way to insure a desired relative balance of the numerical coefficients of the color difference signals being obtained.

Other objects of the invention are those of providing a self-decoding televison receiver instrumentality usable with a single-gun color television image reproducing tube which will provide substantial increases in brilliance of the recreated image, higher resolution in the developed image and which will at the same time reduce the number of component parts and simplify the control circuitry in a way whereby stability and efficiency of receiver operation and over-all manufacturing costs show greatly improved ratios over any now known.

Other objects and advantages of the invention will become apparent to those skilled in the art to which the invention is directed, when the following description of the invention set forth with reference to the accompanying figures of drawing is considered jointly with the claims hereinafter appended.

By the drawings used to illustrate one preferred embodiment of the invention,

Figure 7:
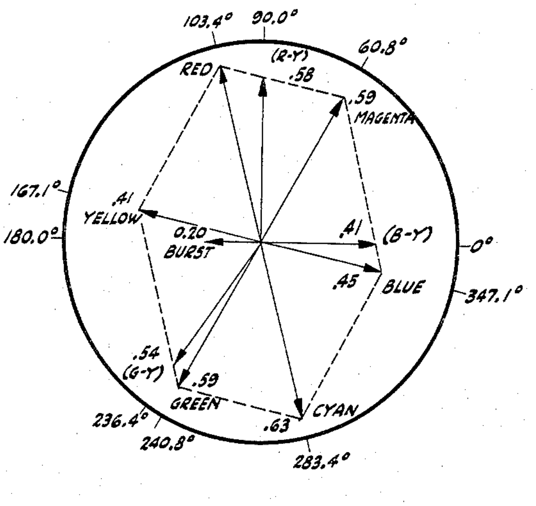
Fig. 7 is a polar coordinate diagram showing the general relationship between the phase of the color burst frequency and particularly illustrating the color sequence according to which signals are transmitted.
Figure 8:
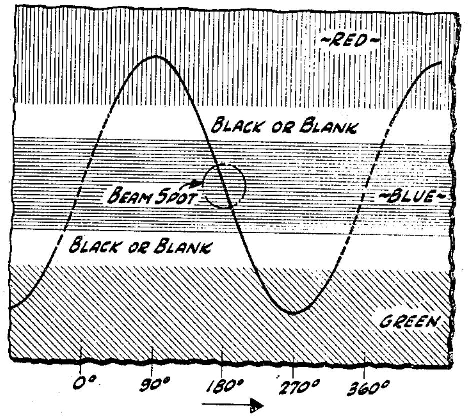
Figure 9:
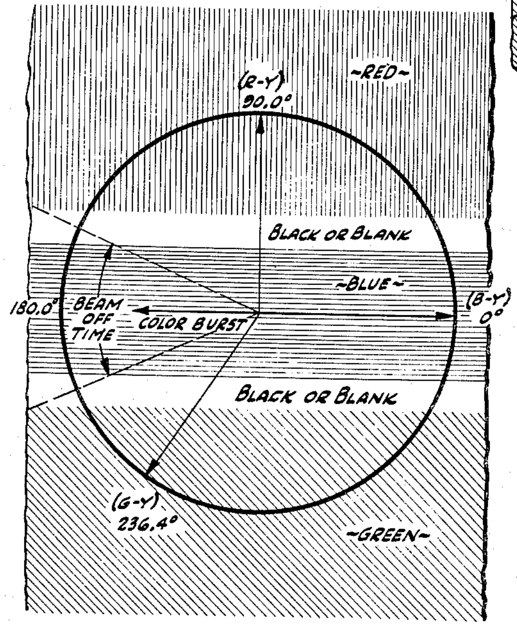
Figure 10A:
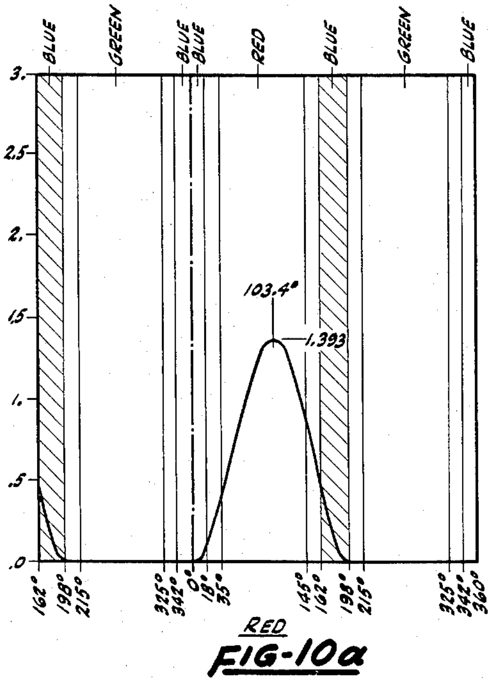
Figure 10B:
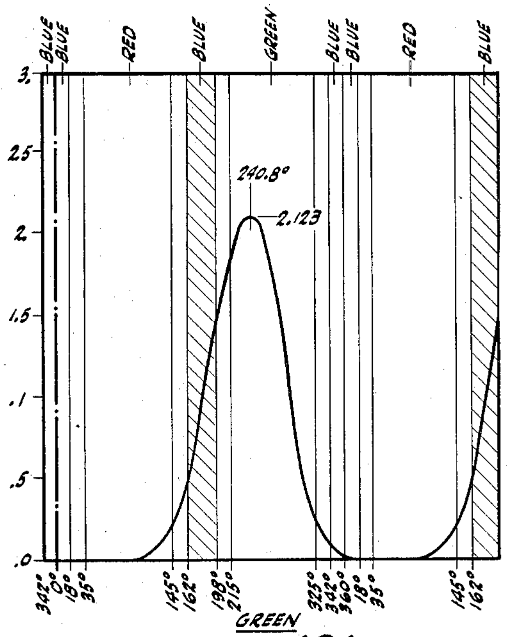
Figure 10C:
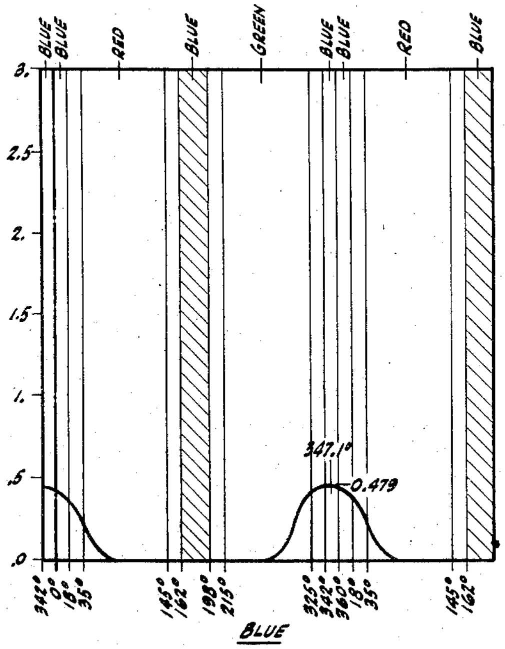
Figure 10D:
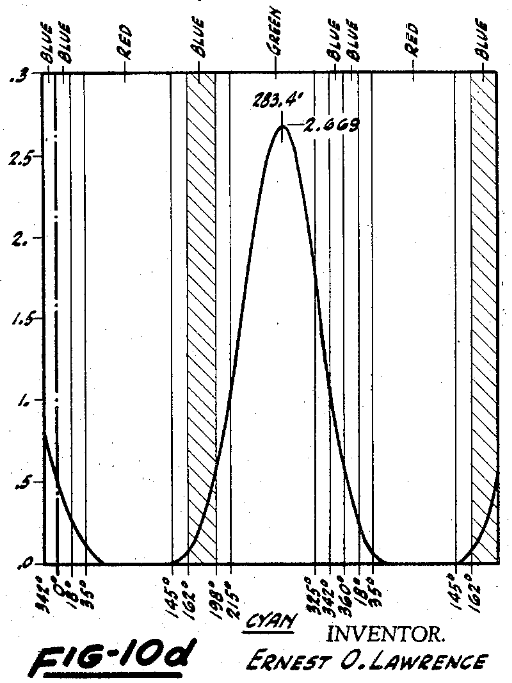
Figure 10F:
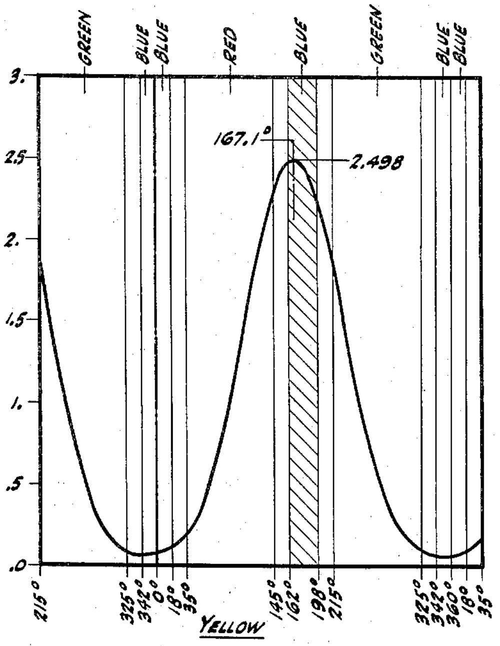
Figure 10G:
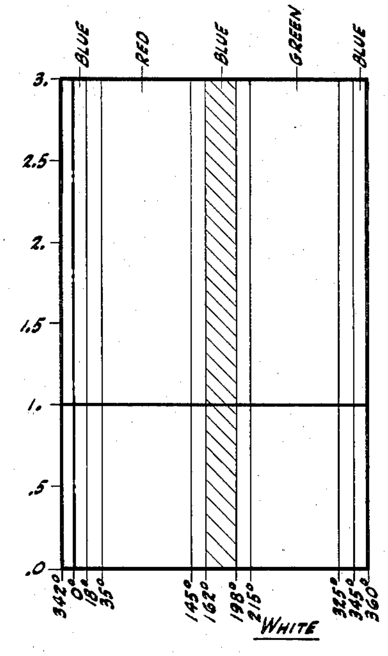
Figure 10E:
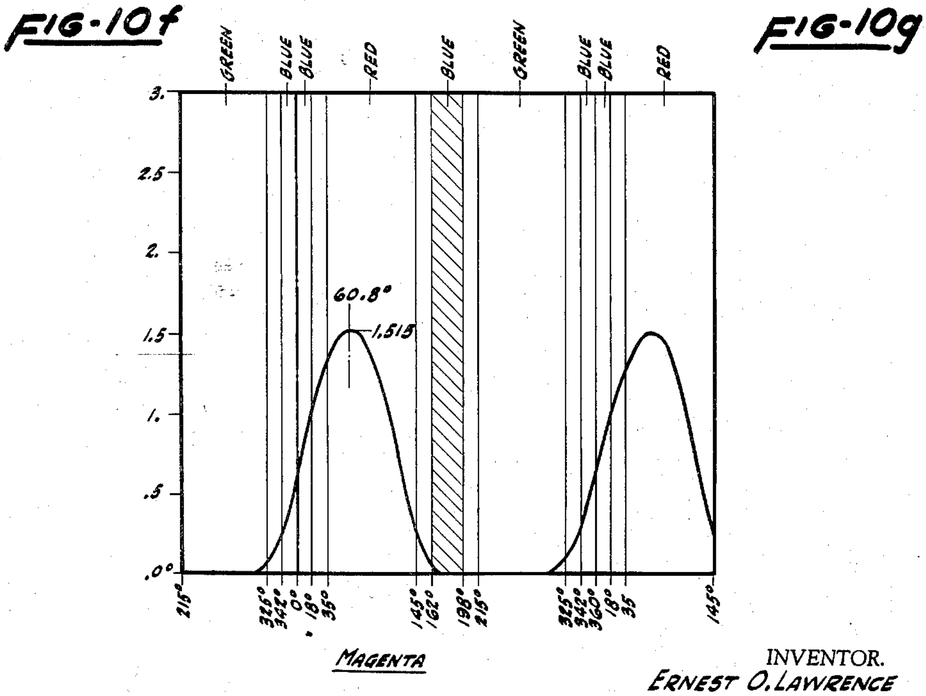
Figures 11A, 11B, 11C, 11D, 11E, 11F:
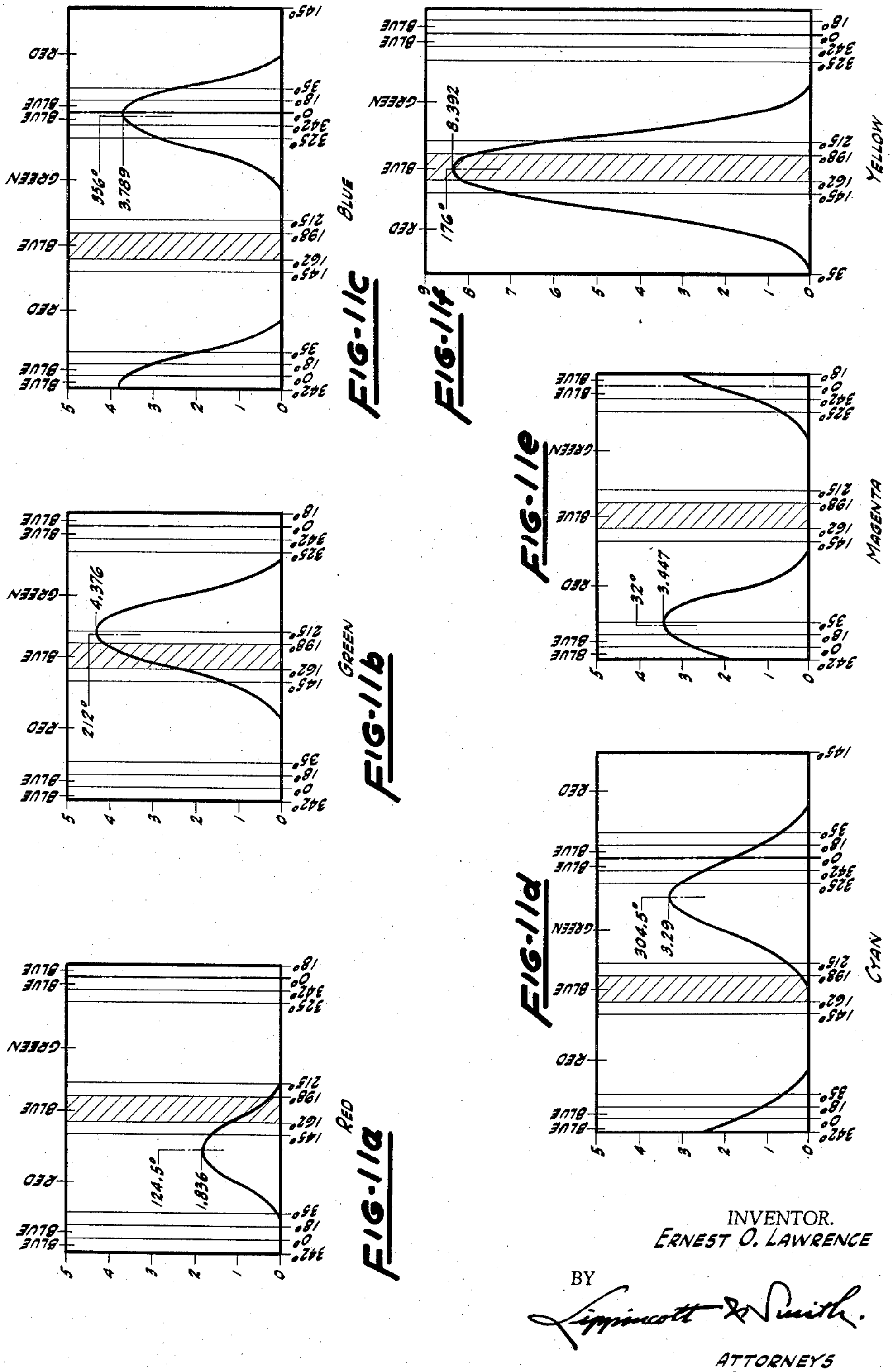

Fig. 8 is a schematic diagram representing generally the scanning beam path of travel in its linear motion along a line path of reproducing a television pattern and illustrating the lateral displacement of the scanning beam with respect to each of the phosphor strips forming a color triplet and indicating also the general strip arrangement preferred with suitable blank, uncoated or dark strip regions located between each adjacent phosphor strip coating in the tube target;

Fig. 9 is a polar coordinate diagram representing in a manner related to Fig. 7 the relationship between the chrominance signal and the color switching sequence on the color image-reproducing tube according to the present invention;

Fig. 10 is a series of curves to illustrate, respectively, the relative intensity of light produced from the several phosphor strips with the scanning cathode-ray beam traverse with respect thereto being in accordance with the pattern of Fig. 8 and the beam suppression time being in accordance with the indicated time of Fig. 9 and the blanked period of scanning motion being indicated by that portion of each line trace carrying over a shaded area, the figure being divided into parts (*a*) through (*g*) inclusive, for the purpose of representing, respectively, light intended to be reproduced in the colors red, green, blue cyan, magenta, yellow and white; the black, of course, resulting from a complete suppression of the beam current and thus an absence of phosphor activation; and Figs. 11*a* through 11*f* are a series of curves similar to those of Fig. 10 with the exception of curve (*g*) and illustrate the curve relationship and color purity obtained by boosting the $(B-Y)$ axis relative to $(R-Y)$.

Figure 1:
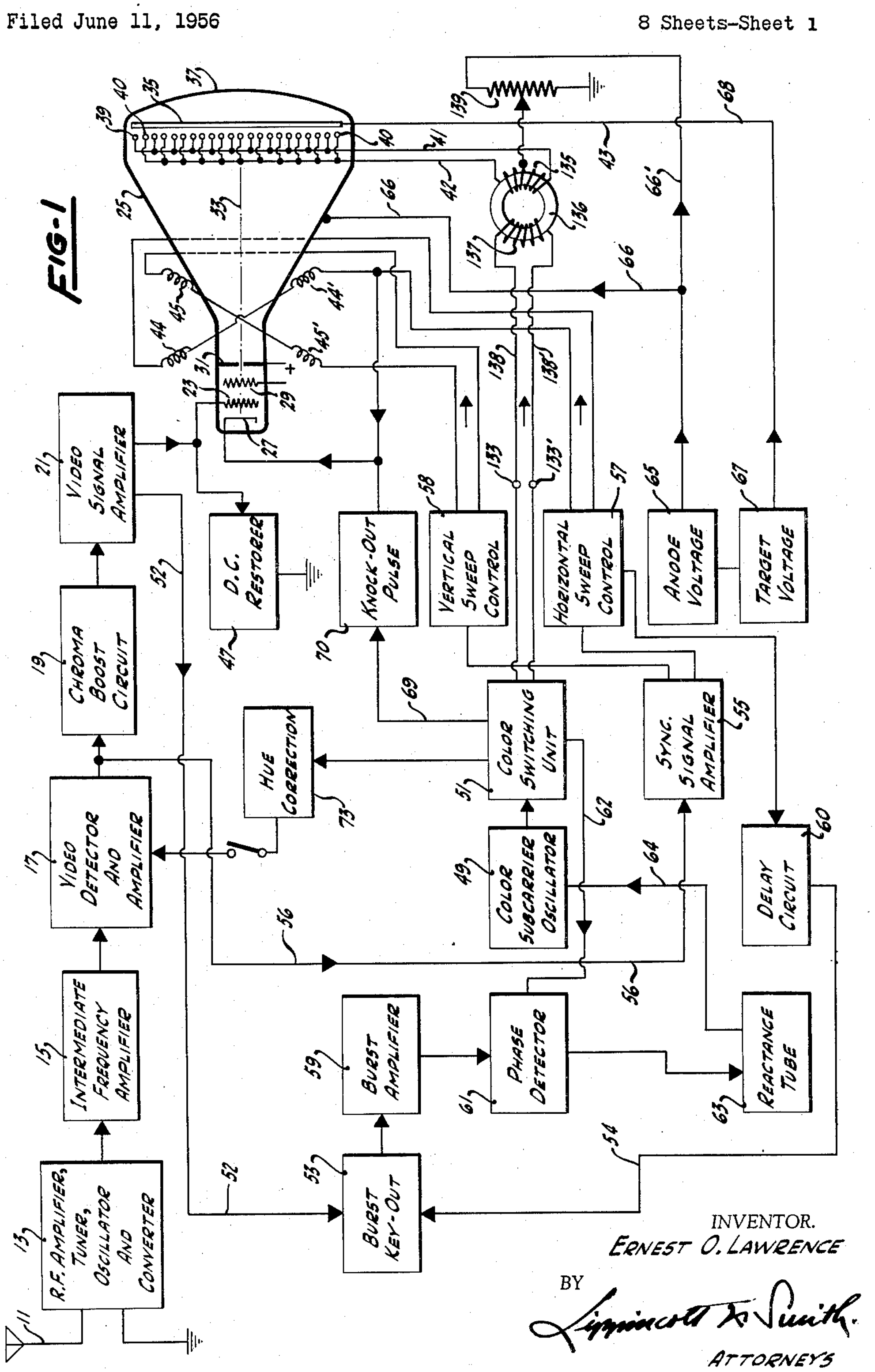
Fig. 1 is a schematic diagram, substantially wholly in block form, to illustrate the circuit components functioning to reproduce the image in substantially natural color on a cathode-ray image producing tube of a single-gun variety.

Now making reference to the accompanying drawings, for a further understanding of the invention, and first to Fig. 1, color television signals of the characteristics previously set forth herein, when received, either via the ether or via suitable cable transmitting networks, upon a receiving component, conventionally illustrated as the antenna 9, are suitably supplied in the well known manner common to any presently commercialized television receiver through a suitable radio frequency amplifier and tuner are fed to a converter to which the heterodyning oscillator frequency is also applied in well known manner to generate intermediate frequencies for amplification. This portion of the receiver is schematically indicated by the reference block 13.

At this point in the discussion no consideration will be given to the audio modulation or to the received audio carrier from which the sound signals are derived, which modulated carrier frequency is transmitted concomitantly with the video carrier and fixedly spaced therefrom since sound signal reception does not, per se, become a part of this invention. The failure herein to discuss the audio channel also is because the invention as herein to be explained is concerned particularly with that video portion of the color television receiver which follows the video signal detector. Therefore, the detailed part of this invention relates to a part of the color television receiver which is beyond the point at which the audio modulation is derived from the incoming signals through the now utilized forms of sound receiver instrumentalities.

The intermediate frequency composite video signals derived from the converter included in the unit 13 are suitably amplified in any desired form of intermediate frequency amplifier, conventionally illustrated at 15, and fed then to a suitable video detector 17. The composite detected video signal output including both video (including both luminance and chrominance portions) and sync signal information, together with the color burst signal, is obtainable at the output of the detector 17 in the diagram of Fig. 1.

The signal passage from one to another of the components illustrated in block form by Fig. 1 is represented by the arrows adjacent to the single connecting conductors, it being understood that the illustration is purely schematic and primarily for general reference. The output from the video detector 17 amplified, as necessary, is then supplied to a so-called "chroma-boost" circuit, schematically diagrammed in block form at 19 and shown more particularly by the circuit of Fig. 2, later to be discussed. The chroma-boost stage serves to perform the function of adjusting the relative level of chrominance information to luminance signals in the encoded composite signal as it is received and detected. The resulting boosted chrominance signal then is applied with additional amplification, as desired, through a video signal amplifier 21, which may be of known character similar to the common form for black-and-white television receivers, to modulate a control electrode, such as the color control grid 23, of a cathode-ray image producing tube 25.

The cathode-ray tube 25 is illustrated in purely conventional fashion, although it is intended to be of a type which is known in the art as the "Chromatron" tube. It comprises an electron gun formed to include the emitting cathode 27, the control grid 23 (usually called the first grid), the second grid 29, and a suitable first anode 31. These elements, for which the source of potential for actuating is not disclosed by Fig. 1, to form a suitable electron gun to develop cathode-ray beam schematically represented at 33 by the dot-dash line, which is projected through the tube toward a screen or target plate or surface 35 arranged at the enlarged end of the tube bulb so as to be viewable through a viewing window such as 37. In this instance the target 35 has been pictured within the tube as a flat plate of a transparency having on the surface thereof faced toward the electron gun suitable phosphor coatings in the character of phosphor strips of extremely narrow width. The strip widths of the phosphors are determined largely by the size of image to be produced with the fact being emphasized that three adjacently positioned phosphor strips capable of individually producing light in the colors blue, green, and red, combine to form one dimension of an image point of each image to be reproduced. The phosphor strips are arranged to extend substantially parallel to a plurality of linear conductors 39 and 40, of which adjacent conductors are electrically insulated relative to each other and alternate conductors are electrically connected to form two sets of interleaved conductors which sets, respectively, connect to energizing conductors 41 and 42, the purpose of which will later be explained.

It will, at this point, be stated, however, that according to known practice the cathode-ray beam 33 in passing through the tube to impact the target 35 is directed through the spaces or apertures formed between adjacent conductors in its passage to the tube target. The tube target surface preferably has an extremely thin film of metal coated upon the phosphors faced toward the electron gun. The metal film is electron permeable and a suitable high voltage relative to the color-control grid is applied thereto by way of the conductor 43. In the diagram of Fig. 1, neither the phosphor coatings nor the conducting film has been shown for reasons of simplicity in illustration and because of the thinness of the coating and film. The general arrangement, however, is well known and provides that the film functions as an electrode to provide, when suitably connected in the receiver circuit, a voltage applied between the average potential effective on the linear conductors 39 and 40 of the color-control grid and the screen of target 35. The applied voltage for efficient tube operation is approximately three times that developed between the cathode 27 of the electron gun and the average potential effective at the color-control grid. Thus, any cathode-ray beam directed through the tube 25 toward the target will be refocused in the region between the color-control grid and the target to focus upon a phosphor strip as a sharply defined spot. Application of suitable potential difference between the interleaved sets of linear conductors of the color-control grid, which can be provided by potentials effective between the electrodes 39 and 40, produces micro-deflection of the cathode-ray beam in the region between the color-control grid and the target to establish thereby the phosphor strip instantaneously impacted.

The phosphor strip arrangement on the target is in a pattern whereby a phosphor strip to produce light in one selected component color is electro-optically centered with respect to each of the apertures between adjacent linear conductors. Phosphor strips to produce light of a second component color are electro-optically centered under each linear conductor 39, for instance, and located between alternate pairs of the first characteristic phosphor-coated strips. Phosphor strips to produce light of the third component color are electro-optically centered under the linear conductors 40 and arranged between the second alternate pairs of phosphor strips to produce the first-named color of light, these different strips constituting the component colors of the tricolor in which color television images are to be reproduced. The strips thus repeat on the target surface according to a pattern *a, b, a, c, a, b, a, c* and so forth, where each of *a*, *b* and *c* represents a different color of three additive component colors in which the color image is to be recreated.

As has been schematically illustrated by Fig. 1, the scanning cathode-ray beam 33 is subjected to the deflecting fields of pairs of deflecting coils 44 and 44' (for instance for horizontal or line deflection) and 45 and 45' (for instance for vertical or field deflection) in the general region of the electron gun, so that as the cathode-ray beam 33 passes downwardly through the tube toward the target, it may be appropriately bidirectionally deflected to trace the raster upon which the image is to appear. The sets of coils 44 and 44' assumed to serve to provide the line deflection of the cathode-ray beam will, for reference purposes, be assumed to provide the deflecting field to move the beam in a direction generally parallel to the linear conductors 39 and 40 of the color-control grid.

Since the detected video signals are usually amplified in the so-called A.C. amplifiers the necessary D.C. component must be reinserted prior to applying the signals as a modulation upon the control electrode 23 of the image-producing cathode-ray tube. A D.C. restorer, conventionally shown at 47 and which may be of any desired type well known in the art, is connected between a point of fixed potential, as ground 48, and the output of the video amplifier 21, to establish the level of signal whereby the restoration of the D.C. component is established. A D.C. reinserting circuit is well known in the art and is illustrated only in conventional form, it being noted, however, that between the D.C. restorer 47 and the point of application of the detected and peaked composite video all connections are of the so-called D.C. variety.

The connections shown for the components so far described provide that all incoming signals, that is, all detected composite video signal modulations shall become effective to modulate the cathode-ray beam 33 within the tube 25. In view of the form of transmission of the signals according to existing standards, the sync signal information from which appropriate beam tracking within the tube and deflection of the developed cathode-ray beam is established, occurs during a beam blanking period and at such times the cathode-ray beam 33 is blanked or suppressed. Otherwise, the video signal modulation effective at the control electrode 23 of the tube 25 constitutes that signal which has been transmitted and which is represented by the combination of the luminance information and the chrominance information, the latter being transmitted as a modulation of a suitable sub-carrier frequency.

The present invention provides ways and means by which the instantaneous modulation of the cathode-ray beam within the image-producing tube 25 may be coordinated with the color instantaneously to be represented so that the point of instantaneous impact of the cathode-ray beam on one or the other phosphor strips coating the target 35 shall be directly related to the angular position of the rotating vector established by the 90° phase separation between the modulation of the color sub-carrier at the transmitter by the so-called "I" signal and the so-called "Q" signal, each of these, as already explained, being derived from appropriate combinations of a produced and matrixed $(B-Y)$ and $(R-Y)$ signal at the transmitting point. The coordination between the beam modulation of the cathode-ray beam 33 in the image producing tube and the particular phosphor strip of the target area which is to be impacted is established, according to the present invention, by a control of the relative potential effective on each of the interleaved sets of linear conductors 39 or 40 of the color-control grid. The establishment and development of this potential is locally determined by the development of a color sub-carrier frequency corresponding in value to that of the suppressed carrier developed at the transmission point.

Figure 4:
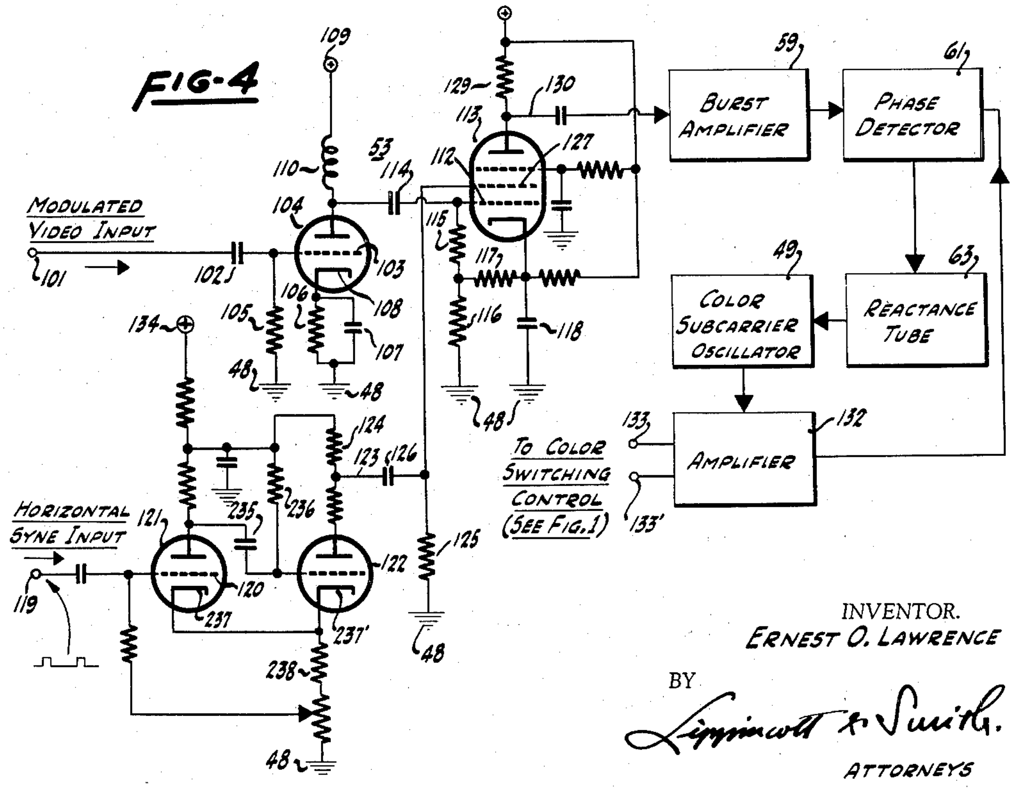
Fig. 4 is a circuit diagram, partly in block form, to illustrate the circuitry for developing the color sub-carrier frequency in the receiver.

In Fig. 1 the color sub-carrier oscillator, which may be an oscillator of any desired type, although for simplicity purposes one of the Hartley type is schematically represented by the block 49, supplies its output to a color switching unit or amplifier 51 which will be more particularly explained in connection with Fig. 4. The color switching unit 51 is essentially an amplifying component which eventually feeds a part of its output (as later to be explained herein) to the conductors 41 and 42 which connect, respectively, to the linear conductor sets 39 and 40 of the color-control grid. Accordingly, the connection provides for the application of potentials on the interleaved sets of linear conductors of the color-control grid which vary with respect to each other at the frequency of the color sub-carrier as developed by the oscillator 49. The potentials effective on the conductors 41 and 42 are 180° out-of-phase so that at the time the oscillation on the conductor 41 is at its crest value in the positive direction, the oscillation is at its crest value in the negative direction on the conductor 42. As the cathode-ray beam 33 is directed through the tube it is moved in position upwardly or downwardly toward whichever linear conductor of the interleaved sets 39 and 40 is instantaneously the more positive. As the output from the color sub-carrier oscillator 49 goes through its nodal points on each of the conductors 41 and 42 there will, of course, be no potential difference between the linear conductors 39 and 40 and the scanning cathode-ray beam passing through the aperture provided between adjacent linear conductors of the color-control grid will focus upon that phosphor strip which is electro-optically centered with respect to the aperture. Otherwise, depending upon its potential effective on the conductors 41 and 42, the impacting cathode-ray beam 33 will be shifted slightly in the upward or downward direction as the case may be, to impact the phosphor-strip area of the target 35.

In view of the fact that the chrominance information can be considered as a vector rotating through an angle of 360° for each cycle of the color sub-carrier it is important, in order that the desired color fidelity be established, that the color sub-carrier oscillator 49 of the receiver shall be correctly phased relative to the phase of the color burst signal following each line sync pulse according to the accepted transmission standards.

Accordingly, to achieve this result provisions are made whereby the detected video output, as available at the video signal amplifier 21, for instance, may be supplied also by way of a conductor 52 to a burst keyout circuit schematically represented at 53 and diagrammed more particularly by Fig. 4 and later herein discussed in more detail. The burst keyout circuit functions under the control of and is keyed by a pulse obtained from the horizontal sync circuit. Since the burst is transmitted, in time relationship, following the line sync pulse, the burst keyout 53 is supplied via conductor 54 with a pulse obtained from the line or horizontal sweep control 57 which is, in turn, controlled from the conventional type of sync signal separator and amplifier 55 to which the detected composite signals are supplied through conductor 56. Usually, in the sweep control, the sync pulse can be obtained in desired phase for control of the burst keyout 53 but, if desired, any desired form of delay circuit 60 may be included in this signal path. The sync signal amplifier 55 and the control 57 are each of generally known character, the former serving both to separate the line sync pulses and the field sync pulses from the composite video signal, according to known fashion of separation, and from these signals to derive the synchronizing signal components only and to appropriately amplify the selected sync signals. These synchronizing signal components are then used to control a suitable horizontal or line sweep control 57 and the vertical sweep control 58, later to be discussed. The burst keyout unit 53 is gated only under control of the sync pulses delayed to become effective at the desired time so that the sub-carrier burst frequency only appears at the output tube amplified in suitable fashion in the burst amplifier conventionally shown at 59.

While the input signal to the burst keyout 53, as supplied by the conductor 52, includes all chrominance information in addition to the color burst, the burst keyout selects the color burst signal only in its output and supplies the burst to the burst amplifier 59. This burst signal, as amplified, is then supplied to a phase detector 61 of well known character, to which is also supplied the output of the local sub-carrier oscillator 49 as available through the conductor 62. The color burst voltage may be applied, for instance, in push-pull fashion to the phase detector 61 with the color sub-carrier supplied in push-push fashion, or the two signals may be supplied in reverse fashion, with the result that depending upon the state of unbalance will depend the voltage developed across an output load to be supplied in well known fashion to control the gain of reactance tube, conventionally represented at 63, which is connected with the sub-carrier oscillator 49. A variation in the gain through the reactance tube serves in well known manner either to control the inductive or the capacity value effective instantaneously in the tank circuit of the color sub-carrier oscillator 49 to which the reactance tube 63 is connected by way of the conductor 64 and thus to modify and phase the oscillator frequency. This form of connection is illustrated in schematic fashion only since, broadly, the control of an oscillator through the use of a phase detector to which the oscillator frequency and a suitable control frequency are each supplied is well known in the art and has been used for a considerable time period in connection with television circuitry. Therefore the schematic illustration is believed to be completely sufficient to a full disclosure of this invention, since this component is not, per se, novel, except in the combination concerned.

With the color-subcarrier oscillator having been corrected and phased relative to the color burst it will be apparent that the potential finally made available between the conductors 41 and 42 representing the oscillator output and which potential is to be supplied between the interleaved linear conductors 39 and 40 of the color-control grid of the image-producing tube 25 will occur so that the maximum voltage can be looked at as 90° out-of-phase with the color burst. Thus, for instance, the developed voltage wave will be a signal voltage which is phase controlled relative to the signal voltage applied to the modulating electrode 23 of the tube 25 which is indicative of the $(B-Y)$ condition.

It was already suggested in the preceding description that the line sync and field sync impulses forming a part of the composite detected signal supplied by way of conductor 56 to the sync signal amplifier and separator 55 could be used to control the horizontal or line sweep control 57 and the vertical or field sweep control 58. This control is also in accordance with well known practice for black-and-white receivers and, per se, forms no part of the present invention. However, it will be sufficient to note that the deflecting coils 44 and 44', for instance, are supplied from the output of the horizontal sweep control and appropriate amplifying circuits (not shown) while the deflecting coils 45 and 45', for instance, are supplied from the output of the vertical sweep control 58 and appropriate amplifying circuits (not shown).

Suitable anode voltage may be derived from the tube according to well known practice from the snapback voltage developed during the course of saw-tooth line deflection pattern, the components for developing which voltage are schematically illustrated in block form at 65. The developed voltage is supplied by way of conductor 66 to a suitable conducting film upon the inner wall of the cathode-ray tube or directly to the tube envelope or to the anode element 31 of the electron gun. It also will be noted that the anode voltage from the block 65 is applied as the average potential upon the linear conductors 39 and 40 of the color-control grid through the conductor 66' and the potentiometer 72. The tapping point on potentiometer 139 connects to the midpoint of the winding 135 on the toroid 136, as will be discussed in reference to Fig. 4.

The high voltage to be applied to the film coating the target 35 may be developed by way of voltage doublers of well known character connected to be supplied from the voltage generator 65. The conventionally represented component 67, from the output of which the high voltage components are supplied by way of the conductor 68, is purely schematic of this part of the circuit and represents well known means to derive high voltage.

The foregoing circuit provides for blanking the receiver tube during a selected portion of the cycle of the locally generated frequency, which occurs at the frequency of the color sub-carrier. The blanked portion of the oscillation of the scanning cathode-ray beam, due to micro-deflection, relative to that phosphor strip is for that time within which it is electro-optically centered on the apertures between adjacent conductors 39 and 40 of the color-control grid. To this end an output voltage is derived from the color switching unit occurring at the color sub-carrier frequency and supplied by way of a conductor 69 to a so-called "knock-out" pulse amplifier 70, further exemplified by the circuitry of Fig. 5, whereby during a portion of the oscillation cycle depending upon the bias level to which the knock-out pulse amplifier component is set and the phase of the pulse developed, a suitable blanking voltage is supplied to an electrode of the complete electron gun structure of the tube 25 wherein the scanning cathode-ray beam is developed. As illustrated, the blanking control is supplied by way of the conductor 71 to the cathode-element 27 and for this purpose it will be appreciated that the polarity of the blanking signal made effective is in the positive sense so that controlling tht bias level over which the developed color sub-carrier must control the tube will determine the time within which color blanking at each image point is caused to occur. This time period will be more fully explained in its relation to other components with the aid of the reference diagram of Fig. 9 and other related figures.

In order that a suitable control of the color video may be established corrective circuitry may be introduced between the unit for developing the color sub-carrier and the video detector and amplifier. This corrective circuitry provides hue correction and is schematically represented by the component 73 and will further be described in detail in connection with Fig. 6. At this point it should be noted also that the color sub-carrier regenerator is generally conventional in form and serves to provide a signal corresponding in frequency with and rigorously locked to and phased with the transmitted chrominance information.

At times it may be desirable to provide a corrective control of the color observable on the target 35 over and above that which is obtained by the circuitry diagrammatically shown by Fig. 1. This further control is obtainable with the aid of a delay line, introduced, for instance, between the color sub-carrier oscillator 49 and the color switching unit 51, to change the phase of the color switching at the color-control grid relative to the color burst. The control serves to provide a phasing adjustment to match the instantaneously selected phosphor color with the proper range of the chrominance phase.

When desired, the knock-out pulse generator 70 for providing a control of the scanning beam blanking during a part of each oscillating cycle may also be controlled from the color switching amplifier through a second delay line of any suitable character to introduce a delay or control to provide suppression of the light which otherwise would result from the phosphor strip.

Figure 2:
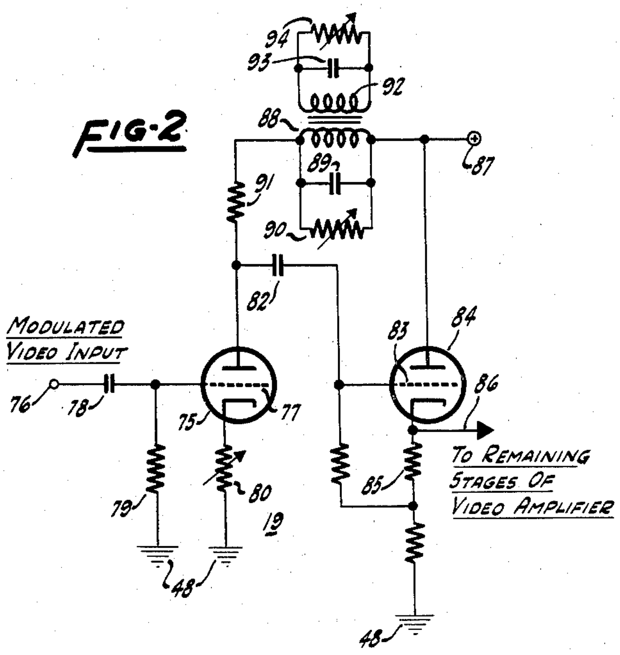
Fig. 2 is a schematic representation of one portion of the circuit diagrammatically depicted by Fig. 1 and serves to illustrate circuitry to boost the chrominance signals of the composite video signal relative to the luminance signals.

Fig. 2 suggests the circuitry for one particular form of the chroma-boost circuit. It may be assumed, illustratively, that it is desired for high fidelity reproduction of the image to increase the amplitude of the chrominance information in the signal as compared to the luminance information since the transmission level is normally lower. For this purpose the detected video signal is supplied to the chroma-boost circuit of the character schematically shown by the block 19 in Fig. 1, with one suitable circuit being shown in detail by Fig. 2.

The transmission of the signal information is such that the so-called (*R—Y*) component is normally transmitted at an amplitude of about 0.877 of the luminance information and the so-called (*B—Y*) signal is transmitted at an amplitude of approximately 0.493 of the luminance information. The chroma-boost circuit, which also may be looked upon as a color saturation patent, may be considered as one which will boost or peak the so-called color difference relative to the luminance information so as to give unity coefficients to both color difference signals.

The boost circuit 19 comprises an amplifier tube 75 to which the video modulation signals are supplied at the input terminal 76 to be fed to the control electrode 77 through the coupling condenser 78. Resistor 79 connected between the control electrode 77 and ground 48 serves as a leak resistor for the tube and the unby-passed cathode resistor 80 preferably variable in nature provides tube bias. Signal output available at the anode or plate 81 is fed through the usual coupling condenser 82 to the input or control electrode 83 of a tube 84 having the output obtained across the cathode resistor 85 and supplied to the succeeding stages of the video amplifier by way of connector 86. Plate voltage supply for the tube 75 is made available at the terminal 87 through the peaking circuit comprising the inductor 88, the capacity 89 connected in shunt therewith and adjustably damped as devised by a resistor 90 shunting the combination. This peaking circuit is connected serially between the plate voltage supply terminal 87 and the plate or anode 81 of the tube through the plate resistor 91. The peaking circuit comprising the inductance 88 and its shunt capacity 89 is tuned to the frequency of the color sub-carrier frequency, i.e., 3.58 mc. This characteristic is indicated by the curve shown by Fig. 3 where for normal conditions and in the absence of the peaking circuit the amplifier response at increased frequency tends to fall off generally according to the dotted line path shown on the curve wherein impedance (Z) is plotted against frequency.

Figure 3:
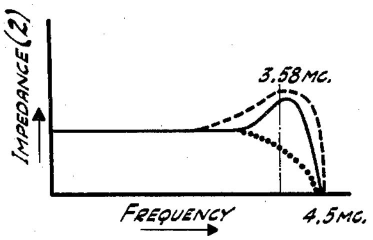
Fig. 3 is a curve indicative of the response ratio of the receiver with respect to frequency when utilizing the boost circuit of Fig. 2.

With the inclusion of the peaking circuit in series with the plate supply with the tube 75 the response of the circuit at the color sub-carrier may be peaked as indicated by the solid line on the curve of Fig. 3 in the region of the indicated color sub-carrier of 3.58 mc.

There is a second tuned circuit comprising the inductance element 92 shunted by the capacity 93 and the resistor 94 which is over-coupled to the inductive element of the peaking circuit for well known purposes. Tuning of the peaking circuit may be broadened where desired by adjustment of the resistor element to provide modifications of the response characteristic which have been schematically illustrated by the dash line portion of the curve of Fig. 3 in the region of the indicated color sub-carrier. It will be appreciated that the output available from the tube 84 on the conductor 86 to be supplied to subsequent video signal amplifier stages such as those indicated at 21 of Fig. 1 will provide peaked response of the chrominance information in the region of the color sub-carrier and in addition will include the video information from the minimum frequency through to the permissible frequency limit conventionally represented on Fig. 3 as being at approximately 4.5 mc.

The description of Fig. 1 made reference to the so-called burst "knock-out" unit 53. Further detailed description of this component is set forth by the circuitry depicted in Fig. 4. The modulated video input as available on the conductor 52 from the video signal amplifier 21 is supplied at the input terminal 101 and though a coupling condenser 102 upon the control electrode 103 of an amplifier tube 104 having the usual grid leak resistor 105 connected between the grid electrode and ground 48.

Bias for the tube is set by the cathode resistor 106 suitably by-passed for high frequency by the capacity element 107, each connected between the tube cathode 108 and ground. The tube 104 is supplied with plate operating voltage from a terminal point 109 through a series peaking coil 110. The peaking coil 110 with its distributed capacity is designed to resonate at the color subcarrier frequency of 3.58 mc., whereby the tube output is available on the conductor 111 and is supplied to one of the control grids 112 of the amplifier 113, the burst frequency is accentuated. The output from the tube 104 feeds to the keying amplifier 113 by way of the usual coupling condenser 114 with the resistors 115, 116 and 117, the latter two of which are shunted with the capacity, serving as voltage dividers to appropriately bias the tube in well known fashion.

Line sync signals which have been selected from the detected composite signal, and derived as schematically represented by Fig. 1 by the sync signal separator and amplifier to become available from the horizontal sweep control 57 on the conductor 54, are supplied as line sync impulses at the input terminal 119. Where the pulses are not delayed at the point in the sweep control 57 at which they are derived so that they occur in time coincident with the color burst signal an auxiliary delay circuit 60 (as in Fig. 1) may be included. The sync signals at terminal 119 should be timed to coincide with that time when the color burst is present in the composite signal applied to terminal 101.

The sync pulses are applied as positive polarity pulses to the control electrode 120 of the amplifier tube 121. The output signal from tube 121 is then applied to a connected stage 122 by way of the indicated connection of generally known character. The tubes 121 and 122 are connected as a "one-shot" multivibrator. The tubes have a common plate supply connected at terminal 134. The tubes also have their cathodes 237 and 237′ connected and plate current for each tube flows through cathode resistor 238. The time constant circuit comprising condenser 235 and resistor 236 forms a control over the delay. Normally tube 122 draws current due to bias supplied from source 134 through the resistor 236. This raises the cathode potential relative to ground 48 to an extent to cut off tube 121 in the absence of an applied input pulse.

At the time tube 121 is cut off its cathode potential is positive relative to ground and its grid control electrode 120 is close to ground potential due to the connection as indicated. When tube 122 has a substantially steady current flow through it there is no transfer of pulse voltage through capacitor 126 and grid 127 of tube 113 is effectively at ground and current flow cannot occur in the tube 113 to its output. The result is that if the video modulation on tube 104 is applied in the positive sense the tube 104 will normally draw current. This will make the grid 112 of tube 113 normally negative. Then with the arrival of the sync and burst information current flows will be reduced in tube 104 and the transfer of potential will be in a direction to raise the potential in grid 112 in a direction tending to cause current flow through tube 113. However, no current actually will flow unless the grid 127 is "gated" under the control of the pulses applied at terminal 119.

When positive pulses are applied at terminal 119 they cause tube 121 to draw current. This, in time, cuts off tube 122 with a resulting positive pulse from the rise in plate potential on tube 122 being adequate when transferred through capacitor 126 to initiate current flow in tube 113 by the control effect excited on the grid element 127 thereof. This output is measured by the voltage change occurring at the plate terminal of the output or load resistor 124. Bias or grid 127 of tube 113 is at ground potential but with current flow the grid leak resistor 125 controls the tube.

The output voltage from the amplifier 132 is thus a series of bursts at the color sub-carrier frequency, occurring at the line or horizontal scanning frequency rate. This oscillating voltage becomes available at the terminal points 133 and 133′ from which points it is supplied in the fashion already known in the art, to an inductor 135 connected as a winding on a core 136, such as the indicated toroidal core, which is coupled to the primary winding 137 energized from the color switching unit by way of the conductors 138 and 138′.

The connection of the interleaved sets of linear conductors 39 and 40 of the color control grid to receive high frequency oscillations through a toroidal transformer is well known, it being understood, of course, that the coupling transformer winding is intended to resonate with the capacity between the linear conductors at a frequency corresponding to that of the color sub-carrier developed by the oscillator 49.

It was pointed out in the earlier part of this description that the transmitted chrominance information can be considered effectively as a vector rotating through 360° at the frequency of the color sub-carrier and phased so that the $(B-Y)$ condition is 180° out of phase with the color burst (see, for instance, the diagrams of Fig. 9 and Fig. 7). It was also pointed out in what has preceded that because the cathode-ray beam 33 developed within the tube 25, and directed toward the phosphor target 35, is oscillated under the control of the potential difference applied between the linear conductors 39 and 40 in each full cycle it normally passes twice over the phosphor strip electro-optically centered with respect to the aperture between the adjacent linear conductors. To achieve the color representation desired blanking of the scanning operation during one such traverse becomes desirable. The blanking effected in this respect is achieved by a control pulse which may for convenience be termed a "knock-out" or blanking pulse which may be applied to one of the electrode elements of the electron gun of the cathode-ray tube to suppress during the selected period application the developed cathode-ray beam. One circuit to effect this type of operation has been schematically represented by the knock-out pulse generator shown by Fig. 5.

Figure 5:
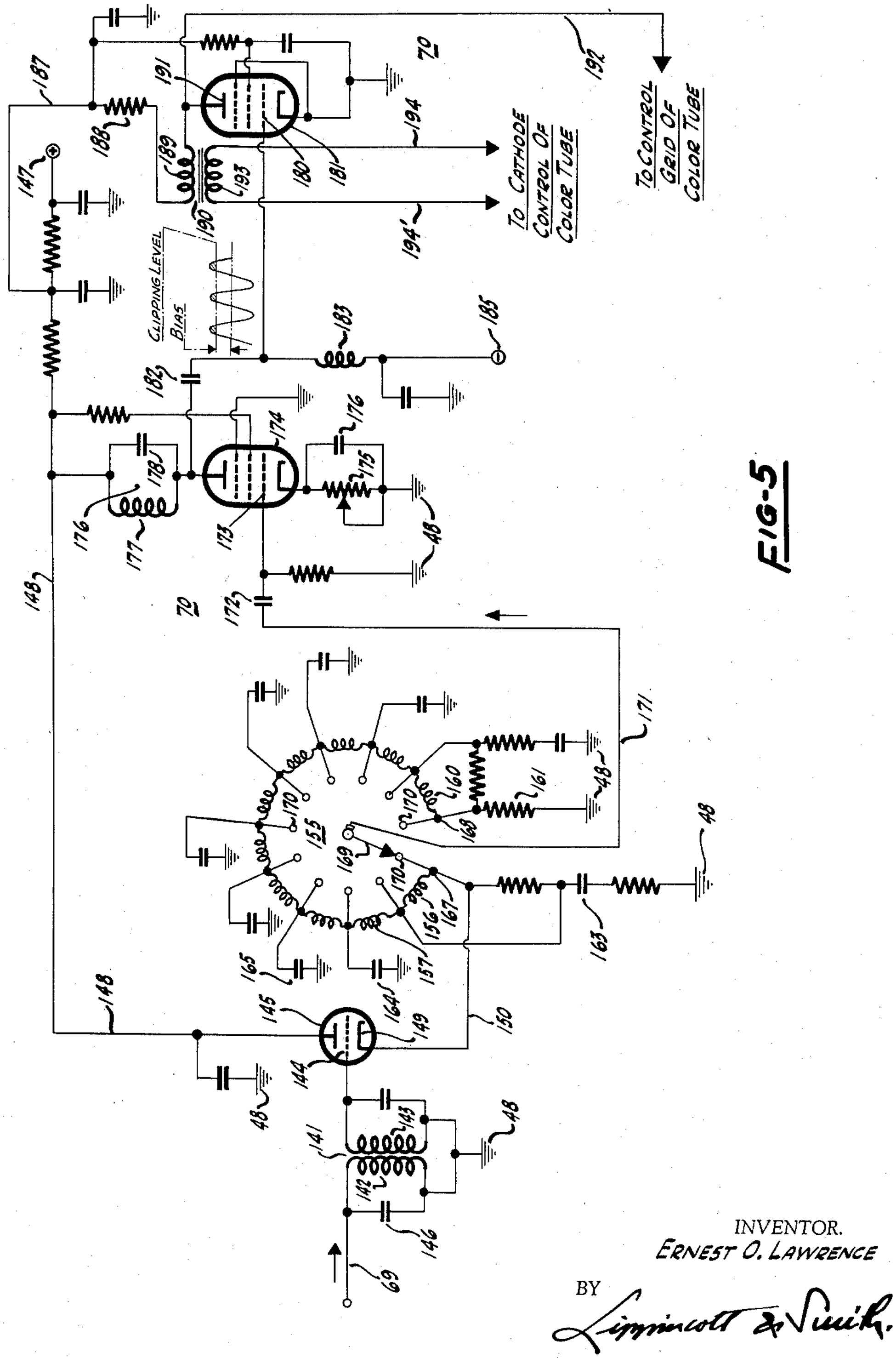
Fig. 5 is a circuit diagram of a portion of the receiver showing particularly the delay line control, as well as the modulation and blanking control, on the color image-reproducing tube.

Making reference now to Fig. 5 of the drawings, the frequency of the color sub-carrier, suitably amplified, if desired, which is made available at the output of the color switching unit (see Fig. 1) on the conductor 69 is supplied through a coupling transformer 141 comprising the tuned primary winding 142 and the secondary winding 143 to the input or control electrode 144 of a coupling tube 145. The primary winding 142 of transformer 141 is appropriately tuned by a capacity element 146 and the inductance of the primary winding 142 and the capacity of capacitor 142 is made resonant at the frequency of the color sub-carrier, namely, 3.58 mc. The tube 145 is supplied with a plate operating voltage from a terminal point 147 via conductor 148. Output from the coupling tube 145 is derived as a cathode output from the cathode element 149 connected through conductor 150 which connects to the delay line 155 comprising a multiplicity of inductance elements 156, 157, 158 and so on. To one end section 156 the input from conductor 150 is connected at terminal 167 and to the last section 160 connected at terminal point 168 the ground connection at 48 is established through the resistor element 161. The delay line thus provides the D.C. path for the tube 145. The delay line comprises the usual capacitance elements 163, 164, 165, etc., which connect each inductance element 156, 157, 158, etc., to ground. The assumed delay which can be introduced between the point 167 to which the cathode of the tube 145 is connected and the terminating point 168 is assumed to be a full 360° at the color sub-carrier frequency of 3.58 mc. A slider, conventionally shown in the form of a rotating contactor 169 is arranged to contact, as desired, any one of the contact points 170 to derive therefrom any desired phase delay of the color sub-carrier frequency as supplied through the coupling tube 145 to the delay line.

The selected delayed phase of this color sub-carrier, determined for utilization in accordance with the position of the rotary contactor 169 on the contact points 170, is supplied by way of the conductor 171 and coupling capacity 172 to a control electrode 173 of the amplifier tube 174. Bias for the amplifier tube is appropriately supplied through the cathode resistor 175, by-passed for high frequency by the condenser 176. Plate voltage for the tube 174 is supplied from the terminal point 147 through the tuned circuit 176 comprising inductive element 177 and the capacitor 178 serving as a load for the tube. The circuit 176 is also tuned to the color sub-carrier frequency and serves to peak the output of the tube 174, particularly in this frequency.

The amplifier color sub-carrier wave delayed with respect to the phase of the color burst to whatever extent is desired by the delay line 155 is then supplied to the control electrode 180 of a keying tube 181 by way of the capacitor 182 and across the inductor 183. Bias for controlling the keying level and thereby the level at which tube 181 will pass current and thereby establish a clipping level for the input voltage occurring at the color sub-carrier frequency is established by a connection made at an indicated terminal point 185. This bias level is preferably adjustable. Thus, only the shaded portion of the input voltage wave, as indicated by the curve associated with the input signal supplied to the control electrode 180, which is of an amplitude above the controllable bias indicated by the dotted line, is effective to control the tube 180 to determine the portion of the input wave (and thus the time in the cycle) which will establish the current flow. This is represented by the shaded section above the indicated clipping level. The tube 180 also receives its operating plate voltage from the terminal point 147 by way of the conductor 187 and the plate resistor 188 and the primary winding 189 of a transformer 190, the purpose of which will later be discussed.

Output voltage from the tube 180, as obtainable at the plate or anode 191, is supplied by way of the connection shown at 192, to a control electrode such as the electrode 29 of the image-producing tube 25. It will be noted that provided the tube 181 conducts during the shaded portion of the indicated applied voltage wave, the polarity of the resultant pulse on the conductor 192 will be in a negative direction, and, when applied, for instance, to the control electrode 29 of the tube 25, will serve to suppress the developed cathode-ray beam 33 for the duration of tube conduction.

In the event, however, that it is desired to suppress the beam of the cathode-ray tube by a control of the cathode, the potential of the cathode may be raised for a short period of time corresponding to the period of tube conduction by supplying the voltage available at the secondary winding 193 of the transformer 190 through conductors 194 and 194' to the cathode circuit of the cathode-ray tube 25. The connections are alternative and one or the other may be used, depending upon the convenience of operation by appropriate control through suitable switching means (not shown).

The showing of Fig. 5 is intended to make clear the fact that the video signal information indicative of both chrominance and luminance may be supplied to one control electrode of the image-producing tube 25 at all times and with the instantaneous impacting position of the scanning cathode-ray beam 33 determined by the output of the color switching unit and amplifier, as supplied through the transformer 136, the operation of the scanning beam in a selected portion of its oscillatory motion relative to the phosphor-coated strips of the color triplet is established in a way whereby the traverse of the scanning beam is effectively transformed to a circular path covering once each of phosphor strips to produce the three component colors since the beam is suppressed prior to the start of the next succeeding cycle of traverse. This condition of operation is exemplified particularly by the diagrammatic showing of Figs. 8 and 9, and will later be referred to in further detail.

Figure 6:
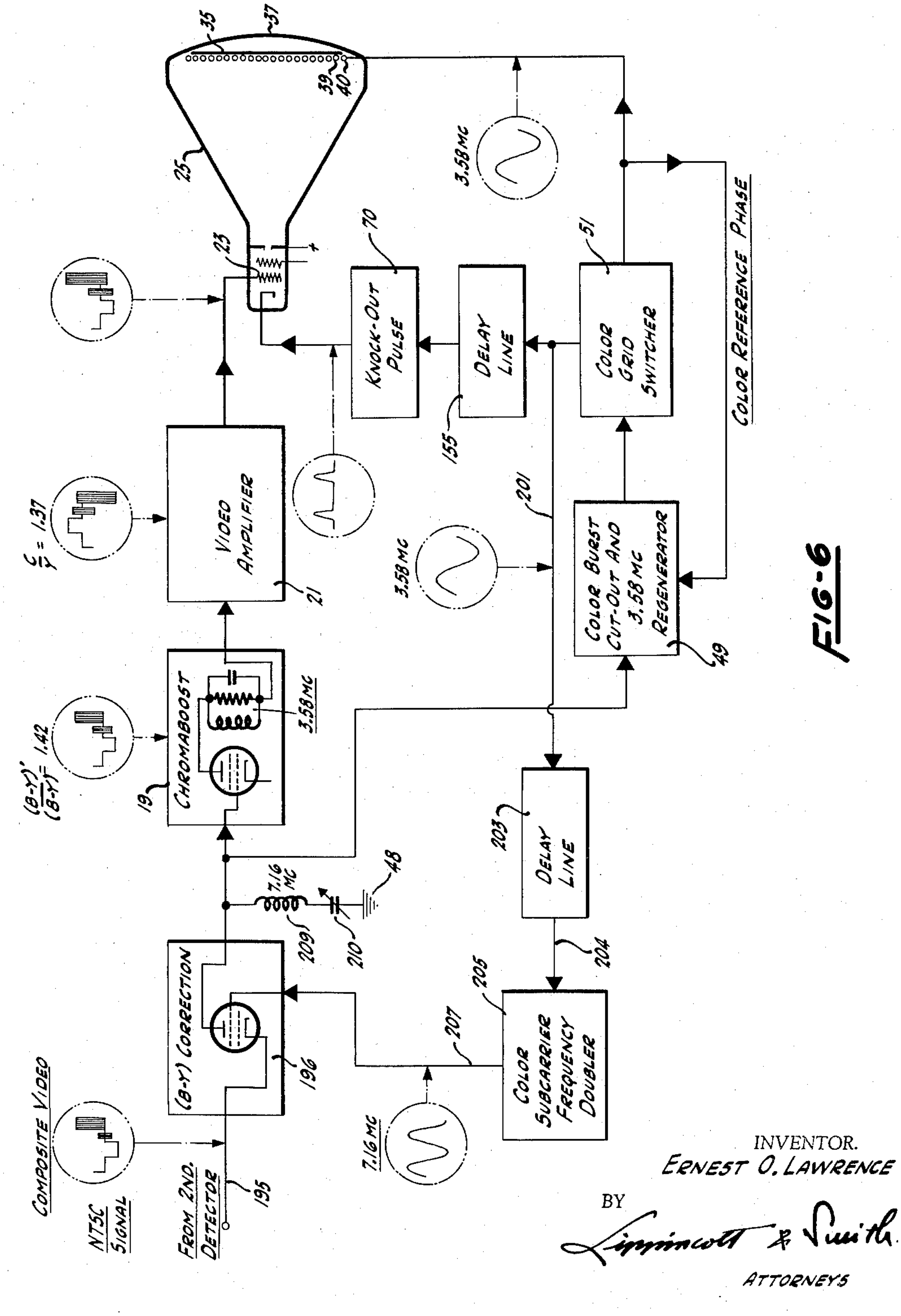
Fig. 6 is a circuit diagram, partly in block form, to illustrate the relationship between the color boost frequency and the color-grid control in the cathode-ray tube.

For the moment, reference may now be made to the schematic indication of the circuitry of Fig. 6 which is intended, generally, as a summation block diagram of the operation so far described and reduced to a simplified form over and above that shown by Fig. 1. There is added in Fig. 6 a showing of the output signal derived from the video detector and amplifier 17, which is applied to the input connection 195 to a conventionally represented circuit for establishing, for instance, an accentuation of one of the color components with respect to the other. Illustratively, and taking into consideration at this time also the diagrammatic showing of Fig. 7 representing a polar coordinate diagram of the NTSC color sequence, it will be appreciated that if the so-called $(B-Y)$ signal is transmitted at reference phase which is 180° out of phase with respect to the color burst, and that the $(R-Y)$ signal is transmitted at what may be considered −90° with respect to the initiation of the color burst, that a control may be established whereby, if desired, one of these signal components may be accentuated and amplified with respect to the other, for instance, to improve color fidelity.

For this purpose the input signal which is to be supplied to the video amplifier conventionally represented at 21 is passed through a so-called $(B-Y)$ correction circuit 196. Details of the specific correction circuit herein shown forms a part of another invention of Jerome M. Rosenberg which is being concurrently filed and will not herein be discussed in detail except to point out that the incoming signal to the correction circuit 196 is supplied, as indicated, as a modulation on one of the modulating electrodes of a suitable amplifying tube and to a second modulating electrode of the same tube. A signal voltage of appropriate frequency to serve as a variable bias is applied to the same tube. This bias progressively changes, as will later be explained in further detail, and makes the component 196 operate as an elliptical amplifier.

Generally speaking, since it is desired that one of the color components, for instance the $(B-Y)$ component, be accentuated relative to the other component, that is the $(R-Y)$ component, and since it is evident that each of these components is transmitted as both a positive and a negative indication due to the fact that the vector is assumed to be rotating at the frequency of the color sub-carrier, it is evident that a control of the $(B-Y)$ component might occur at twice the frequency of the color sub-carrier, which double frequency may be assumed herein as being 7.16 mc. To obtain this frequency the generated color burst frequency, corresponding to the color sub-carrier frequency (developed by the color sub-carrier oscillator 49 and supplied by the color grid switcher 51) is also supplied by way of a conductor 201 to a delay line 203 of conventional characteristics. The delay line 203 may be provided to delay the output available at the conductor 204 relative to the generated phase of the color sub-carrier by any desired period, usually 90°, although this is purely illustrative. This makes the color sub-carrier frequency and the double frequency reach crest amplitude and peak concurrently. The delayed frequency appearing in the conductor 204 is supplied as an input signal to a color sub-carrier frequency doubler, conventionally indicated at 205. This unit is shown merely in diagrammatic form, in that frequency doublers are generally well known in the art and may be provided in various ways. If desired, the color sub-carrier frequency doubler may even be in the form of a ringing circuit tuned to double the frequency of the input exciting or pulsing voltage. Or, the frequency doubler may be of various other known forms. The output, however, is a frequency of 7.16 mc. constituting the doubler value of the assumed input of 3.58 mc. and is available on the conductor 207 to be applied to one control electrode of an amplifier tube of the correction circuit 196. This control voltage, occurring as it does as double the color burst frequency, is of generally sine wave form and when applied as a bias on the connecting circuit functions with the normal bias, thereby controllably increasing and decreasing in a cyclic manner the amplification level so that the level of the correction circuit 196 is cyclically changed. The output from the correction circuit 196 (with the $B-Y$ component of the signal assumed to be accentuated) is then supplied to the chroma-boost circuit 19 of the connection already described.

In order to remove the double frequency of 7.16 mc. which has been applied to the correction circuit 196 for accentuating, for instance, $(B-Y)$ information relative to the $(R-Y)$ information a by-pass circuit comprising the inductance 209 and series connected capacity 210 connected to ground 48 shunts the input of the chroma-boost circuit 19. The series connection of the inductance 209 and the capacity 210 provides a circuit which is made series-resonant at double the color sub-carrier frequency whereby the double frequency may be removed from the input to the component 19. This is usually desirable despite the fact that the video amplifier 21 normally passes an extremely low level output at a frequency spaced as widely from the carrier as is the doubler frequency. Immediately adjacent to various conductors and components of the diagrammed Fig. 6 various waveforms are shown illustratively in circled representations. These waveforms are intended to represent waves as discernible on the screen of an oscillograph tube, depicting the waveform instantaneously available. They are purely illustrative and serve solely for explanatory purposes.

Reference may now be made to the polar coordinate diagram of Fig. 7 which is intended for the purpose of showing the three pole color sequence and the general vector relationship of the components achieved by a rotating vector in both spectral and non-spectral colors. In this diagram it is assumed that the so-called $(B-Y)$ signal is developed at a reference angle one hundred eighty degrees (180°) out of phase relative to the phase of the color burst. The $(R-Y)$ signal is discernable as lagging the color burst by 90°. The primary color red will appear at approximately 103.4° counter-clockwise from the $(B-Y)$ representation. In the reference angle used herein the angle has been determined throughout by calculating counter-clockwise from the $(B-Y)$ condition. The burst for color synchronization and the control of the generation of the color sub-carrier at the receiver can be considered to occur at the time when the rotating vector is 180° out of phase with the $(B-Y)$ representation, which would correspond to the $-(B-Y)$ representation.

The various colors, such as the red, yellow, green, cyan and blue constituting spectral colors are indicated in their general relative positions by legends applied thereto. The non-spectral color of magenta constituting a combination of red and blue is represented in the quadrant between $(B-Y)$ and $(R-Y)$ as approximately 60.8° displaced from the $(B-Y)$ position. The relative relationships of the various signals with respect to each other insofar as amplitude relationship is concerned are designated by the diagram. In this diagram the representations are, illustratively, for color bars of a pattern represented by the color legend for 100% saturated color. The phase with respect to the reference zero, that is, the $(B-Y)$ state, represents the hue while the amplitude represents the saturation. If then it be understood that the various color difference signals are adjusted to have unity numerical coefficients and are then added to the brightness signals, the following relationship, as is known, results:

$$Y+(R-Y)=R$$
$$Y+(B-Y)=B$$
$$Y+(G-Y)=G$$

This provides a three pole sequential red, blue and green signal.

With a single gun image-reproducing tube of the general type depicted and described as the component 25 in Fig. 1, for instance, where a sine wave color section voltage is utilized, a four-pole color sequence of phosphor selection results. This can be appreciated by reference to the showing of Fig. 8, where the phosphor strips to produce light in the colors red, blue and green are indicated by the direction of the sectioning in accordance with approved color designations. The spaces indicated between each adjacent strip are incapable of producing light in any color.

This lack of color at such time may result preferably from either a complete absence of phosphor coating between adjacent strips or alternatively, coatings in strip formation which are impermeable to the electron beam may be provided. On the showing of Fig. 8 this type of area has been represented by the legend "black" and on the same figure the legends "red," "blue" and "green," respectively, designate phosphor strips of a character to produce light in the indicated color.

Still further referring to Fig. 8 the circle appearing on the strip to produce blue light is intended schematically to represent the spot instantaneously traced by the cathode-ray beam as it impacts the target and the phosphor strip coatings thereon. The path over which the impacting cathode-ray beam is assumed to oscillate with respect to each color triplet, in accordance with the color switching described in connection with Fig. 1 and Fig. 4 as provided by the voltage wave supplied through the transformer 136 to the conductors 41 and 42 connecting respectively to the interleaved linear conductor sets 39 and 40, is assumed to cause the cathode-ray beam spot to trace a path relative to each color triplet which conventionally may be illustrated by the sine wave trace of Fig. 8.

The line or progressive linear motion of the cathode-ray beam across the target surface is represented by the arrow on the figure. Notation of the showing of Fig. 8 at once makes apparent that the time for a color switching cycle coincides with the time required for the chrominance as diagrammed by Fig. 7 to go through all of its possible instantaneous values. Where the color switching is phased so that the chrominance is at reference zero degrees, i.e. $(B-Y)$, in accordance with the showing of Fig. 8 the blue phosphor will be activated or subjected to the impact of the produced cathode-ray beam. Then, as the chrominance goes through its remaining values, that is, as the color vector rotates, the other phosphors are selected with the beam being over the phosphor to produce red light at the 90° position. Again, the beam passes over the phosphor to produce blue light at the 180° position and then over the phosphor to produce green light at the 270° position, roughly speaking, assuming, of course, that a strip to produce blue light is centered relative to the strips to produce the red and blue light components.

In this connection, however, reference should also be made to the showing of Fig. 9, bearing in mind that the Fig. 8 representation makes completely clear that the scanning beam spot in each cycle of oscillation, and in the absence of control thereon as explained by the circuit of Fig. 5 would trace twice in each cycle a phosphor strip to produce light in one of the colors, that is, blue. To avoid this difficulty and to avoid a situation where inaccurate color representations would occur since the position of the rotating vector in the region of about 167° counter-clockwise from the $(B-Y)$ position should produce yellow, it will be apparent that the effect of the scanning cathode-ray beam on the phosphor should be suppressed for otherwise blue light would be added to red and green. Therefore, as is particularly shown by Fig. 9 and where it may be assumed that the vector rotates according to the circular pattern the cathode-ray beam 33 in the image-producing tube 25 is suppressed for that angle, illustratively, which is indicated between the dash lines of Fig. 9 and represented by the legend "beam off time."

Accordingly during the trace period from approximately 160° removed from the $(B-Y)$ condition and for a time continuing for about 20° past the $-(B-Y)$ state, which is represented on the sine wave trace of Fig. 8 by the dash line, the cathode-ray beam 33 is suppressed. This beam suppression is effected by the produced "knock-out" pulse described particularly in connection with the block diagram showing of Fig. 1 and the circuitry explained by Fig. 5.

In the other angular positions of the rotating vector, considering each of Figs. 7, 8 and 9 together, it will be appreciated that, in the illustrated application of the invention, the color representations are such that no image representation is made during the traversal of the central phosphor strip of the color triplet following the traverse of the strip to produce red light and immediately preceding the time of the strip to produce green light. Further than this, it will be appreciated that while the invention is being described herein with the strip to produce the blue light in the central-most position, it must be emphasized that this is merely illustrative and presented for the purpose of showing that a considerable time utilization may be given to the green light producing phosphor customarily used for producing increased high light brilliance. Where desired, the reference phase may, of course, be controlled by the adjustment of the phase of the switching of colors by the potentials applied to the linear conductors of the sets 39 and 40 and still further the phase of the "knock-out" pulse provided by the component 70 may be adjusted to correspond to the desired unwanted second crossing of the center phosphor strip of the group for reasons already explained.

Reference to Fig. 10 will now be made for the purpose of showing generally the composition of any desired color from the beam-trace phosphor strip. On this pattern of Fig. 10 which is divided into component parts (*a*) through (*g*) inclusive, legends for the phosphor strip areas have been applied rather than the color cross-sectioning for reasons of simplicity. Portions of the strip indicating legends separating the rectangular portions designating particular colors will be understood to be incapable of producing light in any color, and illustratively, will represent spaces between adjacent strips such as the spaces represented by "black" in Fig. 8. At this point it may be noted that in practice the strip widths are usually in practice not all equal. In one tube type the outer strips of each color triplet are made about 50% wider than the center strips.

The strip widths on the target are traversed in different time periods due to the path of the oscillations of the beam produced by the color-control grid. Considering now portion (*a*) of Fig. 10 with the diagrams of Figs. 7, 8 and 9 in mind, and appreciating that the "chromaboost" circuitry explained particularly in connection with Figs. 1, 2 and 6 peaks the chrominance signals to an assumed ratio of 1.37 of that at which they are received, and bearing in mind that in a cathode-ray tube the beam current is related to the applied modulating voltage by a factor of approximately a power of 2.2 it will be appreciated that the beam current to produce red, for instance, 100% saturated, is here considered equal to 1.393 times the unity current assumed, for instance, to produce white as indicated by curve (*g*) of this figure. The values are in some respects subjective and it must be borne in mind that while a current value is shown at one particular point relative to a phosphor the effect is relative and the light produced is the same at any angle within the strip.

This also is based upon the factor that for white the current is of unity strength as the scanning beam traverses the phosphor strips to produce light in each of the colors red, blue and green. It will also be noted from a consideration of curve (*a*) of Fig. 10 that actually the maximum beam current is reached in the production of this signal at approximately 103.4° relative to the $(B-Y)$ position, assumed at zero degrees. The scanning beam is suppressed due to the "knock-out" pulse during the traverse of the blue light producing phosphor in the region between that illustrated at 162° and 198°, that is, an 18° position ahead and behind the $-(B-Y)$ or color burst condition. However, it will also be noted that there is introduced into the signal nonetheless a very small percentage of light from the blue as illustratively indicated in the region of approximately 10° and 18° but at such a low level that the overall effect of blue is negligible.

If curve (*b*) is now considered the production of the green image will be seen to reach its crest value at approximately 240.8° relative to $(B-Y)$ zero position and the beam current is then approximately 2.123 times that for the production of white. The beam also will be noted to pass over the phosphor to produce red light to a very minor extent as well as to traverse the blue light producing strip for a small portion of the time due to the rotating vector relationship to the phosphors. However, this is not a significant contamination of the color as the level is extremely low.

Next, illustratively, if curve (*f*) of Fig. 10 be considered wherein there is a representation of the production of yellow it will be appreciated that yellow, being formed of the primaries red and green, for instance, will represent a peak beam current of 2.498 relative to unity for red, blue and green to produce white. It will, however, also be noted that at the time the scanning beam reaches an angular position due to deflection coinciding with 167.1° relative to the $(B-Y)$ condition that it has already been suppressed due to the knock-out pulse provided by the control unit 70 which is indicated on curve (*f*) of Fig. 10 by the fact that the beam trace is passing over a shaded area marked blue. The yellow, however, is developed during the period that the beam is traversing the phosphor strips to produce red and green and the relative intensities of the red and green light is indicated by the areas under the curve.

As the scanning cathode-ray beam, represented schematically by the substantially sine wave curve on Fig. 10–*f*, traverses the several phosphor strips of the color triplets it will be observed that the beam current produced in the region between 35° and 145°, which occurs while traversing a phosphor strip to produce red light, is more intense than it is in the region when traversing the phosphor strip to produce green light, illustrated in the region between 215° and 325°. The result is that the area beneath the curve indicative of the scanning cathode-ray beam traverse in the so-called red area is greater than that beneath the curve indicating the traverse of the phosphor strip to produce green light. Consequently, since the scanning cathode-ray beam traverse over the strip normally to produce blue light has been suppressed by the so-called "knock-out" pulse, and since the light level resulting from the scanning beam traverse of a strip of the phosphor where blue light is actually produced is extremely low, there results some color contamination of what is desired to be a saturated yellow since the red predominates over the green and in this region where one would desire a pure saturated yellow the yellow which actually appears is a yellow which is high in red light intensities and it also gives the appearance of a slightly desaturated color due to the presence of low level blue.

Reference to Fig. 11–*f* and the explanation there made will illustrate the way by which this color impurity may be corrected, it being understood, however, that merely resorting to the color representation depicted by Fig. 10–*f* still produces a generally satisfactory color representation but not a color representation in which there is the same subjective appeal to pure yellow representations as can be had with the refinement depicted by Fig. 11–*f*.

This condition according to Fig. 11–*f* can be corrected by an adjustment of the relative phases of the scanning beam with respect to the impact on the phosphor and also can be adjusted by accentuating the level of response of the $(B-Y)$ signal relative to the $(R-Y)$ signal, as was explained in connection with the discussion of Fig. 6. These conditions are exemplified by the curves of Fig. 11 where the component parts (*a*) through (*f*) respectively represent the same colors as those depicted by the parts (*a*) through (*f*) respectively of Fig. 10 which are red, green, blue, cyan, magenta and yellow.

If now, by application of the $(B-Y)$ correction whereby the values of the $(B-Y)$ signal are boosted with respect to the $(R-Y)$ and Y signals, the curve (*f*) of Fig. 11 makes clear that the beam current reaches a strength of 8.392 relative to unity white at 176°. This occurs in a region when the scanning beam normally would traverse the phosphor strip to produce blue light, although at this time the scanning beam actually is suppressed. However, when the beam traverses the phosphor strips to produce the red and the green light, the colors necessary for the production of yellow, the beam is no longer suppressed and produces light in the two colors with the areas under the curve representing the red and the green light values in which the areas under the curve in each color substantially coincide, which indicates a substantially more yellow color, as against a yellow extremely high in red light, as per Fig. 10–*f*. Further, since the beam current in the region where blue light producing strips are traversed is zero, the yellow becomes saturated.

If now, the color representation for red as per curve (*a*) of Fig. 11 is considered with the so-called $(B-Y)$ correction added, it will be noted that while the relative current strength is 1.836, as compared to unity white, this crest value is arrived at an angle of 124.5° relative to $(B-Y)$ being at zero degrees and that the area under the curve is substantially only that which results when the beam traverses the red light producing phosphor.

If now, the color green, as per curve (*b*) of each of Figs. 10 and 11 be considered, it will be appreciated that it is possible to represent the green in practically the same light values. According to the diagram of Fig. 10, the green was contaminated to a very minor extent by a light from the blue light producing strip, as well as by a light from the red light producing strip. This served merely to decrease the saturation of the color produced. With the correction introduced as per the component 196 of Fig. 6 it will be observed that the contamination due to blue has been substantially eliminated. It also will be observed that the peak value of the signal now occurs at approximately 212° and at a level of 4.376 in contrast to that shown by Fig. 10. The minor contamination due to red light, the combination of red and green producing yellow, detracts only to a minor extent from the purity of the resultant desired color.

Illustratively, by the curves of Fig. 10 a combination color, of which cyan represented by curve (*d*) is one example, will be seen to comprise a great deal of green but an extremely limited portion of blue. By introduction of the correction of the $(B-Y)$ accentuation, as disclosed by Fig. 6, a reference to related curve (*d*) of Fig. 11 establishes that the amount of blue added to the green is substantially increased. Also, by Fig. 11(*d*) it can be seen that the beam current reaches a maximum value at a later point in the cycle, that is, 304.5° counterclockwise from $(B-Y)$, and that the beam current is increased over that shown by Fig. 10(*d*) to a current relationship which is increased in the ratio of 3.29 to 2.669 (the uncorrected state).

It may be worthwhile to consider also the curve representations for the production of blue light as per the diagrams of Fig. 10–*c* compared to Fig. 11–*c*. So considered, it will be observed that in the uncorrected waveform of Fig. 10–*c* where the beam current on reaching its peak value at about 347.1°, as compared to $B-Y$ equals zero, is at a value of only 0.479 as compared to a unity level which would normally be developed for white, as per Fig. 10–*g*. For these conditions also it will be noted that while there is a substantial area under the curve in the region of the blue light producing phosphor strip there likewise is a very substantial area under the curve as the beam is traversing a strip to produce green light and likewise a moderately substantial area under the strip to produce red light. The predominance of green causes the colors which are intended to represent blue to have a high percent of green which tends to make sky, for instance, have a greenish or cyan cast, the red of course functioning together with the green and the blue to desaturated the blue light. This not an intolerable situation but by correcting or modifying the $(B-Y)$ signal level, as compared to the $(R-Y)$ signal, and by a control of the character represented by Fig. 6 it will be seen by referring now to the curve of Fig. 11–*c* that while the scanning cathode-ray beam current reaches a maximum at 356° it has increased in value to something of the order of 3.789 as compared with unity in the case depicted by Fig. 10–*g* for white light. The result is that the area under the curve in the region where the scanning cathode-ray beam traverses a strip to produce blue is greater, likewise it will be observed from the curve of Fig. 11–*c* that the area under the curve in the region where the beam is traversing the green strip is close to being that which appears under the curve as the beam traverses the red light producing strip. The substantial equality between the resultant light produced from the green and the red strips, where blue is desired and intended, is of a nature tending only to desaturate slightly the desired saturated blue, but because of the substantial equality of areas beneath the curve in the green and the red areas color contamination is eliminated. In addition, it will be observed that even in nature and in sky, blue is seldom seen as a saturated color so that the minor degree of desaturation under the conditions depicted by curve 11–*c* does not detract from the overall operational efficiency of the disclosed circuits.

From the foregoing it is thus apparent that various adjustments in the control may be established while converting the four pole color sequence into a three pole color sequence with the aid of color accentuation and appropriate control of the phase relationship between the actual traversal by the beam of any target strip area with respect to the instantaneous angular relationship of the color vector rotating with respect to the color subcarrier.

In the preceding description of this invention emphasis has been placed primarily upon scanning the phosphor-coated target area in the line direction according to a path generally along the strip length. This scanning pattern broadly provides that when the micro-deflection is introduced to oscillate the scanning beam at the frequency of the color sub-carrier relative to the phosphor strips forming the color triplets, the beam normally follows a path with respect to the phosphor strips somewhat of the type shown particularly by Fig. 8. However, it should be borne in mind that the invention is in no sense limited to line scanning along the long dimension of the phosphor strips since the scanning may occur in the line direction equally well in a path normal to the strip length with the micro-deflection oscillation at the color sub-carrier frequency similarly introduced. The micro-deflection oscillation introduced during the line scanning trace in the latter a pattern causes the impacting beam to shift in the line direction as it reaches the target in much the manner of a dissolve as the beam passes from aperture to aperture to impact the desired and selected strip dependent upon the relative potential instantly effective on the conductors of the color-control grid. Similarly, the line scanning trace can occur at an angle other than normal or parallel to the strip length following the same principles.

The significant factor is that the amplitude of the induced micro-deflection oscillation shall be sufficient in its peak-to-peak relationship to cause the scanning beam in each cycle to trace normally over all strips of the color triplet. Thus, the amplitude of the micro-deflection can be considered as being greater than the width of any two of the phosphor strips forming a color triplet and no greater than that of the complete color triplet. In either case and no matter how the scanning takes place in the line direction the effect of the modulated scanning beam upon the phosphor is suppressed during the time period when the scanning beam in its oscillation during each cycle at the color sub-carrier rate traces any one particular strip for the second time which, of course, occurs as the beam oscillations move through alternate nodal points. The beam effect at the target is suppressed for selected electrical angular distances with respect to the nodal point as desired (see, for instance Fig. 9). This operation has the effect of converting what would, in any cycle of oscillation, constitute without separate control on the beam a color representation in the colors *a, b, c* and *b* to a color representation during each cycle of micro-deflection at the color sub-carrier rate to a relationship of *a, b* and *c,* where the letters *a, b* and *c,* illustratively, represent different phosphor strips reacting under the impact of the scanning beam each to produce light in a different color-component of an additive tricolor combination. In this respect it will be appreciated that lacking any so-called "knock-out" pulse control effect on the scanning cathode-ray beam that beam, when passed through the apertures of the color-control grid to the target would normally tend to produce light from the phosphor screen dependent upon its impact position. This position depends upon the potentials applied to the sets of interleaved and electrically insulated sets of linear electrodes of the color-control grid relative to each other. Where the electrically insulated sets of interleaved linear conductors have potentials applied to them and change in a cyclic relationship between positive, negative, and positive after passing through zero in each transition and the change between a maximum positive and a maximum negative potential of one set of linear conductors relative to the other occurs at the frequency of the color sub-carrier, it will be appreciated that any in-falling scanning cathode-ray beam tends to produce illumination in the color representations in an order *a, b, c, b, a, b, c,* and so on, with the color representation appearing most often being that color which results when the interleaved electrically insulated linear conductors are at like potential.

The other two colors are those which are achieved when the interleaved sets of electrically insulated conductors are of different potentials relative to each other. In this designation the letters *a, b* and *c,* respectively, represent different component colors of a tricolor and thus differently produced colors of light. Accordingly, a so-called "forward color progression" of color representations might be considered as the colors *a, b* and *c,* repeating in the same order while a "reverse color progression" might be considered as the colors *c, b, a,* repeating in the same order. With the knock-out pulse being effective to suppress the center color, as it were, on its second traverse of one light producing phosphor, it will be appreciated that the color signal representations, resulting from scanning, always occur in a forward progression, such as *a, b,* and *c,* and so on, where the center color would provide, if repeated, a reverse progression. It is this reverse progress which is eliminated.

Since the color information may be regarded as resulting from a rotating vector and as occurring cyclically at the color sub-carrier rate, the circle of spectral and purple (or magneta) characteristics with sub-carrier phase angles change in the NTSC color transmission is well known. This damage may be considered as always occurring in a forward progression of color representations, as it were. Accordingly, by removing the re-trace color representation through the control of the knock-out pulse, the color pattern of scanning is brough into precise coincidence and order with the spectral colors resulting from phase angle changes in the color transmission. In this respect it will be appreciated that if the center color, assumed as the color *b* in the foregoing example, the said color cannot occur during one portion of the oscillatory cycle. Also, in an optimum operational state the selected component-colors, assumed as *a, b,* and *c,* may be phased, as desired, with respect to the change in spectral chromaticities and in accordance with which selected component colors would normally be twice reproduced. In this sense, therefore, the forward progression of colors is always maintained and the tendency to provide a reverse progression of colors is eliminated by suppressing the second reproduction of assumed color *b* during each cycle of the color sub-carrier.

The system in this regard is completely flexible and wide variations and color ranges are attainable. Having now described the invention, what is claimed is:

1. Television apparatus for producing images in color upon a target formed of a plurality of phosphor areas of three different light-producing color-characteristics arranged in color triplets of repeating patterns, which target is adapted to be impacted by a modulatable cathode-ray scanning beam suitably deflected in both a repeating line and a repeating field pattern and which beam is directed to the target through an apertured color-control grid structure formed of interleaved and electrically insulated pairs of linear conductors so arranged relative to each color triplet that like potentials on the linear conductors cause the scanning beam to pass through the apertures to impact the target to produce light in one of the three color-characteristics and potentials positive and negative relative to each other on the electrically insulated linear conductors cause either of the two remaining color characteristics of light to be produced depending upon which linear conductor of each pair is instantaneously positive which comprises means to detect received NTSC color transmission signals to derive both luminance and chrominance video signal information, means to modulate the scanning cathode-ray beam continuously by the derived video signal information, means to cause the said beam to scan the target in a line and field pattern, means for applying control voltages to the linear conductors of the apertured color-control grid at the frequency of the color sub-carrier of the NTSC signal transmission so that concurrently with scanning, the normal color characteristic of the produced light appears in the order *a, b, c, b, a, b, c, b* and so on following the cathode-ray beam passage through the apertures so that the impact point tends to move back-and-forth relative to the phosphor areas forming the color triplets with changes in relative potential on the linear electrodes of the color-control grid, and means for suppressing the scanning cathode-ray beam during one selected portion of its cyclic oscillatory movement with the suppression being centered about alternate traverses of one of the phosphors of each color triplet so that the color representations appear in an order of *a, b, c,* blank, *a, b, c,* blank, *a, b,* and so on and the effective illumination is produced in a color cycle of *a, b, c, a, b, c, a, b,* and so on which corresponds to the effective color relationship of the chrominance information in the received video signals, where *a, b,* and *c* represent the chosen three component colors.

2. Television apparatus responsive to NTSC color-transmission signals for producing images in substantially natural color on a target formed of a plurality of phosphor areas of three different light-producing characteristics arranged in color triplets formed in repeating patterns, which target is adapted to be impacted by a modulatable cathode-ray scanning beam suitably deflected in both a repeating line and a repeating field pattern, which comprises means to detect the received NTSC signals to derive both luminance and chrominance signal information, said detected chrominance signal information repeating in a cyclic fashion from which three different color-characteristics are to be recreated, means continuously to modulate the cathode-ray beam by the derived video signal information, means for oscillating the cathode-ray beam at the frequency of the color subcarrier of the NTSC signal back-and-forth in a substantially sinusoidal pattern relative to the phosphor areas forming the color triplets concurrently with the scanning of the target so that the scanning cathode-ray beam thereby impacts one of the phosphor areas twice as often as the other two areas of each triplet per oscillating cycle with the twice-impacted area occuring between impacts of the other two light-producing areas of the triplet, means to control the relative phasing of the oscillations of the cathode-ray beam and the impact of the phosphor areas with respect to the derived chrominance modulation signal instantaneously modulating the cathode-ray beam, and means for suppressing the cathode-ray beam during one of the two periods in each oscillation cycle at the color sub-carrier frequency when it would otherwise impact the twice-impacted area of each color triplet to preclude reproduction of light of a color unlike that instantaneously represented by the chrominance indications.

3. Television apparatus responsive to received NTSC color signal transmissions for producing images in color upon a target formed of a plurality of phosphor areas of three different light-producing color characteristics *a*, *b*, and *c*, arranged in color triplets of repeating patterns, which target is adapted to be impacted by a modulatable cathode-ray scanning beam suitably deflected in both a repeating line and in a repeating field pattern which comprises means to detect the received NTSC color signals to derive both luminance and chrominance video signal information, the chrominance information repeating in a cyclic order corresponding to the color characteristics *a*, *b*, and *c*, means for continuously modulating the scanning cathode-ray beam by the derived video signal information, means for oscillating the scanning cathode-ray beam in a sinusoidal pattern relative to the phosphor areas forming each color triplet and at the frequency of the color sub-carrier of the NTSC signal concurrently with scanning the target in a line direction so that the scanning cathode-ray beam normally impacts said areas of each color triplet in an order *a*, *b*, *a*, *c*, and so on in the oscillation cycle, and means for suppressing the scanning cathode-ray beam during one movement in each cycle across the twice-impacted phosphor area of each color triplet so as to preclude reproduction of light in a color unlike that of the instantaneous chrominance information and to provide a forward progression of color reproduction.

4. The apparatus claimed in claim 3 comprising, in addition, means to accentuate one color range of the detected chrominance video signal information relative to another color range thereof.

5. The apparatus claimed in claim 3 comprising, in addition, means to controllably amplify the chrominance signal to change the signal level of selected portions of each color cycle relative to other portions thereof, means to accentuate the amplification level of all chrominance signals relative to the luminance signals, and means to continuously modulate the scanning cathode-ray beam by each of the said chrominance and luminance signals.

6. In television apparatus responsive to received NTSC color transmission signals for producing color images upon a target formed of a multiplicity of substantially parallely positioned phosphor strips of different light-producing color characteristics when impacted by a scanning cathode-ray beam, the strips being arranged in color triplets of repeating patterns across which target a cathode-ray beam is adapted to be deflected in both a line and a field pattern to impact all of the strips during scansion with the line deflection being substantially along the strip length and the field deflection transverse thereto which comprises means to detect received NTSC signals to derive therefrom both luminance and chrominance signal information, means continuously to modulate the cathode-ray beam by the detected signals to produce light effects on the phosphor strips in intensity proportional to the luminance and in color determined by the instantaneously impacted strip of each color triplet, means to develop locally an oscillatory control voltage under the control of and at the frequency of the NTSC color burst frequency received, means for introducing a sinusoidal deflection transversely of the line scanning path by the locally developed oscillatory control voltage for oscillating the cathode-ray beam back-and-forth across the strips of color triplets at the developed frequency of the NTSC color sub-carrier with the oscillation being relative to a selected central strip of the three adjacently positioned phosphor strips forming a color triplet and of an amplitude to traverse each phosphor of the triplet and occurring concurrently with scanning in the line direction so that the central strip of each triplet is twice scanned during each cycle of the sinusoidal pattern, means to phase the oscillation of the scanning beam relative to each color triplet so that in oscillation the scanning beam impacts a series of three strips of the color triplet in a sequence corresponding to the sequence of information in the component colors of a tricolor transmission, and means for suppressing the cathode-ray beam in each sinusoidal oscillation cycle during line scansion for one of its traversals of the central strip of each color triplet so that color reproduction of the chrominance signals is derived continuously in an order corresponding to transmission and reproduction of unlike color is precluded.

7. The apparatus claimed in claim 6 comprising, in addition, means to shift the phase of the micro-deflection beam oscillation during line scanning relative to the color burst thereby to vary controllably the hue of the additive color image produced.

8. Television apparatus for producing images in substantially natural color on a cathode-ray tube viewing target formed of a multiplicity of adjacently positioned phosphor strips responsive to an impacting cathode-ray beam to produce light in different colors, the phosphor strips being located to extend across the target substantially parallel to one another in sets forming color triplets having one dimension substantially coinciding with that of an element of an image to be created, the strips being in repeating patterns across which strips a modulatable scanning cathode-ray beam produced in the tube is adapted to be deflected in two mutually perpendicular directions, comprising means to detect received NTSC video signals and to modulate the cathode-ray beam by the said detected signals to control the beam continuously by both the luminance and the chrominance information included in the received signals, means continuously to oscillate the developed cathode-ray beam transversely relative to said color triplets in a sinusoidal pattern at the frequency of the NTSC color sub-carrier during its motion in one direction relative to the phosphor strips with the peak-to-peak amplitude of beam oscillation being approximately that of the combined width of the phosphor strips forming one color triplet with the oscillation normally introducing scanning beam impact of the central phosphor strip of the color triplet twice during each oscillatory cycle, and means to interrupt the light producing effect of the scanning cathode-ray beam independently of the signal modulation control within that single portion of each oscillatory cycle at the color subcarrier frequency coinciding with alternate beam traversals over the central phosphor strips of each color triplet so that during line deflection light is developed from the strips of phosphors only in a forward cyclically repeating order of three color components additively combining in balanced relationship to produce white light and light development in a color unlike that of the instantaneous chrominance signal is precluded.

9. The apparatus claimed in claim 8 comprising, in addition, means locally to generate the beam oscillation frequency under the control of the received NTSC color burst oscillations and means to shift the phase of the locally developed oscillation frequency relative to the received color burst to control thereby the phosphor strip impacted at any instant by any predetermined phase of the chrominance signal information thereby to vary within limits the hue of the resulting image.

10. The apparatus claimed in claim 9 comprising, in addition, means locally to vary the relative color values in the produced image by accentuating one portion of the chrominance signal relative to another portion.

11. The apparatus claimed in claim 10 comprising, in addition, means for peaking the chrominance signals at the frequency of the color sub-carrier for changing the signal level of the detected chrominance information relative to the luminance information.

12. Television apparatus for producing images in substantially natural color on a cathode-ray tube viewing target which is formed of a multiplicity of adjacently positioned phosphor strips of different light-producing color characteristics when impacted by the cathode-ray beam, the strips being arranged substantially parallel to one another in sets forming color triplet patterns across which strips a modulatable scanning cathode-ray beam is adapted to be deflected in two mutually perpendicular directions, comprising detecting means to convert received NTSC video signals into video luminance and chrominance signal information, means to modulate the cathode-ray beam by the detected signals to control the beam intensity continuously by both the luminance and the chrominance video signal information included in the detected received signals, means to continuously oscillate the modulated cathode-ray beam at the frequency of the color sub-carrier during deflection in one direction relative to the phosphor strips with the amplitude of oscillation being greater than the width of two phosphor strips and less than the width of three phosphor strips forming one color triplet, and means to interrupt the light-producing effect of the scanning cathode-ray beam upon the phosphor strips of the target independently of the signal modulation control within only one selected portion of each cycle of oscillation occurring at the color sub-carrier frequency with interruptions coinciding with alternate nodal points and each second traversal in each cycle over phosphor strips of one light-producing color characteristic for each color triplet so that light in the color components of an additive tricolor is produced with the beam interruption being of a time period to convert a normal light sequence of *a, b, c,* and *b* for each oscillation cycle to a sequence *a, b,* and *c* only prior to the commencement of the following oscillation cycle, where *a, b,* and *c* represent different colors of light produced from cathode-ray impact of the phosphor strips.

13. Television apparatus for producing images in substantially natural colors on a cathode-ray tube viewing target which is formed of a multiplicity of adjacently positioned phosphor strips of different light-producing color characteristics when impacted by the cathode-ray beam, the strips being arranged substantially parallel to one another in sets forming color triplet patterns across which strips a modulatable scanning cathode-ray beam is adapted to be deflected in two mutually perpendicular directions to produce line and field scanning with the line scanning path being substantially along the strip length, comprising detecting means to convert received NTSC video signals into video luminance and chrominance signal information, means to modulate the cathode-ray beam by the detected signals to control the beam intensity continuously by both the luminance and the chrominance video information included in the detected received signals, means to generate oscillations at the frequency of the color sub-carrier under the control of the received color burst, means to continuously oscillate the modulated cathode-ray beam under the control of the generated oscillations concurrently with its deflection in the line-scanning direction relative to the phosphor strips with the peak-to-peak amplitude of beam oscillation being greater than the width of two phosphor strips and less than the width of three phosphor strips forming one color triplet, and means to suppress the light-producing effect of the scanning cathode-ray beam upon the target independently of the signal modulation control within only one selected portion of each cycle of oscillation at the color sub-carrier frequency, means to relate the suppression of the light-producing effect of the scanning beam to alternate nodal points of each cycle of its oscillation relative to the phosphor strips of the color triplets during line scanning so that one light-representation only is produced from each phosphor strip of each color triplet in each cycle of beam oscillation and a normal light sequence of *a, b, c* and *b* for each oscillation cycle is converted to a sequence *a, b, c* only prior to the following oscillation cycle, where *a, b,* and *c* represent different colors of light produced from cathode-ray impact of the phosphor strips.

14. Apparatus for reproducing NTSC color television signals for image representations in substantially true color on the viewing target of a color television cathode-ray tube wherein the image is developed by a modulated cathode-ray beam directed through the tube to impact a target formed of a series of substantially parallel phosphor strips of three different light-producing color characteristics to represent three additive color components, which strips are arranged in color triplets which are located adjacent to a color-control grid formed of a plurality of substantially parallelly positioned, spaced, linear conductors separated by distances approximating one dimension of an elemental area on an image to be produced, the conductors being adapted to be connected in an electric circuit with adjacent ones electrically insulated from each other and alternate ones electrically connected and arranged relative to the target so that a like character of phosphor strip of each color triplet is electro-optically centered relative to the aperture between each of the linear conductors and the phosphor strips of the other two characters of each color triplet alternate on the target and are centered relative to the linear conductors with like characteristic strips associated with electrically connected linear conductors so that a cathode-ray beam directed through the color-control grid to the target is micro-deflected in the region between the color-control grid and the target to impact one or another of the phosphor strips of the three different characteristics forming each color triplet in accordance with the relative potential on adjacent linear conductors of the color-control grid comprising means to detect received NTSC signals, connections to apply the detected signals continuously as a modulating potential to modulate the cathode-ray beam directed to the target, means locally to generate a carrier frequency corresponding to the chrominance sub-carrier of the NTSC signal, means to control the relative potential of adjacent linear conductors of the color-control grid by locally developed carrier frequency so that the modulated cathode-ray beam is micro-deflected in the region of the target to impact each phosphor strip of each color triplet along a substantially sinusoidal path at the chrominance sub-carrier rate, means for concurrently deflecting the impacted cathode-ray beam for line and field scanning of the target in mutually perpendicular directions relative to each other with at least one of the paths of deflection being transverse to the linear conductors of the color-control grid, and means controlled by the locally developed sub-carrier frequency for suppressing the cathode-ray beam once during each micro-deflection cycle for an electrical angle of movement centered about one nodal point of each cycle of its micro-deflection path to produce light from the impacted phosphor strips in a sequence *a, b* and *c* from a normal micro-deflection pattern traverse of *a, b, c, b* in each cycle of the sub-carrier, where *a, b* and *c* represent phosphor strips to produce different component-colors of light.

15. Apparatus for reproducing NTSC color television signals for image representations in substantially true color on the viewing target of a color television cathode-ray tube wherein the image is developed by a modulated cathode-ray beam directed through the tube to impact a target formed of a series of substantially parallel phosphor strips of three different light-producing color characteristics to represent three additive color components, which strips are arranged in color triplets which are located adjacent to a color-control grid formed of a plurality of substantially parallelly positioned, spaced linear conductors separated by distances approximating one dimension of an elemental area on an image to be produced, the conductors being adapted to be connected in an electric circuit with adjacent ones electrically insulated from each other and alternate ones electrically connected and arranged relative to the target so that a like color character of phosphor strip of each color triplet is electro-optically centered relative to the aperture between each of the linear conductors and the phosphor strips of the other two color characters of each color triplet alternate on the target and are centered relative to the linear conductors with like characteristic strips associated with electrically connected linear conductors so that a cathode-ray beam directed through the color-control grid to the target is micro-deflected in the region between the color-control grid and the target to impact one or another of the phosphor strips of the three different color characteristics forming each color triplet in accordance with the relative potential on adjacent linear conductors of the color-control grid comprising means to detect received NTSC signals, connections to apply the detected signals continuously as a modulating potential to modulate the cathode-ray beam directed to the target, means locally to generate a carrier frequency corresponding to the chrominance sub-carrier of the NTSC signal, means to control the relative potential of adjacent linear conductors of the color-control grid by said locally developed carrier frequency so that the modulated cathode-ray beam is micro-deflected along a substantially sinusoidal path in the region of the target to impact each outer phosphor strip of a color triplet once and to cross the center strip twice during each chrominance sub-carrier cycle, means for concurrently deflecting the cathode-ray beam for line and field scanning of the target in two directions normal to each other with at least one scanning direction being transverse to the linear conductors of the color-control grid, means controlled by the locally developed sub-carrier frequency for suppressing the cathode-ray beam once per sub-carrier cycle for an electrical angle of movement centered about one nodal point of each cycle of its micro-deflection path to produce light from the impacted phosphor strips in a sequence *a*, *b* and *c* from a normal micro-deflection pattern traverse of *a*, *b*, *c*, *b* in each cycle of the sub-carrier, where *a*, *b* and *c* represent phosphor strips to produce different component colors of light, and means for controlling the phase relationship of the beam deflection produced by the color-control grid with respect to the color burst to establish the phosphor strip instantaneously responsive to any selected portion of the cyclically repeating color values represented by detected chrominance signals.

16. Television apparatus for producing images in color upon a target formed of a plurality of phosphor areas of three different light producing color characteristics arranged in color triplets of repeating patterns which target is adapted to be impacted by a modulatable cathode-ray scanning beam suitably deflected in both a repeating line and a repeating field pattern and which beam is directed to the target through an apertured color-control grid structure formed of interleaved and electrically insulated pairs of linear conductors so arranged relative to the phosphor areas of each color triplet that like potentials on the linear conductors cause the scanning beam to pass through the color-control grid apertures to impact the target to produce light in one of the three color characteristics and potentials positive and negative relative to each other on the electrically insulated linear conductors cause either of the two remaining color characteristics of light to be produced depending upon which linear conductor of each pair is instantaneously positive which comprises means to detect received NTSC color transmission signals to derive both luminance and chrominance video signal information, means to modulate the scanning cathode-ray beam continuously by the derived video signal information, means to cause the beam to scan the target in a line and field pattern at rates corresponding to NTSC signal standards, means for applying control voltages to the linear conductors of the apertured color-control grid at the frequency of the color sub-carrier of the NTSC signal transmission so that the normal color characteristic of the produced light appears in the order *a*, *b*, *c*, *b*, *a*, *b*, *c*, *b*, *a* and so on during cathode-ray beam movement back and forth relative to the phosphor areas forming the color triplets with changes in relative potential of the linear electrodes of the color-control grid occurring concurrently with scanning of the target and at the NTSC color sub-carrier rate, and means for suppressing the scanning cathode-ray beam during one selected portion of its cyclic movement with the suppression occurring during alternate traverses of one of the phosphors of each color triplet so that the color representations appear a forward progression only.

17. Color television receiver apparatus responsive to received NTSC color transmission signals for producing color images upon a target formed of a multiplicity of substantially parallelly positioned strips of phosphors of different light-producing color characteristics arranged in color triplets repeating in an orderly fashion across the face of a cathode-ray tube and against which target a scanning cathode-ray beam is adapted to be deflected in both a line and field pattern to impact the strips during scansion for the production of the image raster, the line deflection being substantially along the strip length and the field deflection being transverse thereto which comprises the combination of means to detect the incoming video signals to provide a continuous cathode-ray beam modulation signal cyclically providing chrominance information in selected component colors in an orderly sequence repeating at the frequency of the color sub-carrier and of the luminance intensity corresponding to the brightness of the image to be recreated, means to oscillate the scanning cathode-ray beam relative to the phosphor strips of the color triplets according to a sinusoidal pattern and transversely of the strips so that the nodal points of the sinusoidal pattern are substantially centered on the mid-strip of each triplet so that the said mid-strip is twice traversed during each cycle of oscillation whereby the upper and lower crests of the sinusoidal displacement are substantially centered on the outer strips of each triplet and the outer strips are thereby each once impacted by the scanning cathode-ray beam during each oscillation cycle, means to control the oscillation frequency of the said scanning cathode-ray beam displacement and to lock the frequency to that of the transmitted color sub-carrier of the NTSC signal transmission, means to phase the oscillation of the scanning beam to relate the beam impact on one of the phosphor strips to the corresponding color designation of the detected NTSC video signals, means to modulate the scanning cathode-ray beam continuously during the portion of each oscillation cycle of the scanning cathode-ray beam between the outer strips and once through the mid-strip of each triplet, and means to suppress the scanning cathode-ray beam during the second traversal of the mid-strip during each oscillation cycle thereby to preclude color reproduction instantaneously different from the detected chrominance signal information.

References Cited in the file of this patent

UNITED STATES PATENTS 2,734,940 Loughlin ------------- Feb. 14, 1956